United States Patent
Carlin et al.

(10) Patent No.: US 9,693,241 B2
(45) Date of Patent: *Jun. 27, 2017

(54) MITIGATING EFFECTS OF PREDICTED FAILURES IN A MOBILE NETWORK BASESTATION DUE TO WEATHER

(71) Applicant: International Business Machines Corporation, Armonk, NY (US)

(72) Inventors: Jeremiah D. Carlin, Rochester, MN (US); Michael T. Kalmbach, Elgin, MN (US); Mark D. Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 13/678,603

(22) Filed: Nov. 16, 2012

(65) Prior Publication Data

US 2013/0122894 A1    May 16, 2013

Related U.S. Application Data

(63) Continuation of application No. 13/297,852, filed on Nov. 16, 2011.

(51) Int. Cl.
   *H04W 24/04*    (2009.01)
   *H04L 12/24*    (2006.01)

(52) U.S. Cl.
   CPC ......... *H04W 24/04* (2013.01); *H04L 41/0631* (2013.01); *H04L 41/147* (2013.01)

(58) Field of Classification Search
   None
   See application file for complete search history.

(56) References Cited

U.S. PATENT DOCUMENTS 5,521,793 A * 5/1996 Dalgleish et al. ............. 361/752
5,548,643 A * 8/1996 Dalgleish et al. ............. 379/429
(Continued)

FOREIGN PATENT DOCUMENTS

DE         69934177 T2    10/2007
KR    1020020012358 A    2/2002
(Continued)

OTHER PUBLICATIONS

Combined search and examination report dated Feb. 26, 2013, Application GB1219155.7.
(Continued)

*Primary Examiner* — Gregory Sefcheck
(74) *Attorney, Agent, or Firm* — Martin & Associates, LLC; Bret J. Petersen

(57) ABSTRACT

Basestation equipment in a mobile data network is subject to harsh environmental conditions at many remote locations. International Business Machines Corporation (IBM) has introduced a Mobile Internet Optimization Platform (MIOP) appliance, referred herein as the MIOP@NodeB. This appliance is placed at the edge or basestation of a mobile data network to provide a platform for hosting applications and enhancing mobile network services. The introduction of an edge appliance provides a platform for additional reliability functions. A predictive failure mechanism in the basestation appliance mitigates the effects of predicted failures in a mobile network basestation due to weather conditions. The predictive failure mechanism considers historical data, ambient environmental conditions, weather alerts and weather forecasts to take pre-emptive action to avert partial or total failure of the basestation equipment.

15 Claims, 28 Drawing Sheets

(56) References Cited

U.S. PATENT DOCUMENTS

| | | | |
|---|---|---|---|
| 5,709,100 A * | 1/1998 | Baer et al. | 62/259.2 |
| 6,058,260 A * | 5/2000 | Brockel et al. | 703/4 |
| 6,169,881 B1 * | 1/2001 | Astrom et al. | 455/12.1 |
| 6,353,902 B1 | 3/2002 | Kulatunge et al. | |
| 6,519,461 B1 | 2/2003 | Andersson et al. | |
| 6,552,669 B2 * | 4/2003 | Simon et al. | 340/945 |
| 6,574,082 B2 * | 6/2003 | Vitek | 361/78 |
| 6,937,148 B2 * | 8/2005 | Irwin | 340/539.1 |
| 7,006,947 B2 | 2/2006 | Tryon, III et al. | |
| 7,130,193 B2 * | 10/2006 | Hirafuji et al. | 361/700 |
| 7,181,345 B2 * | 2/2007 | Rosenfeld et al. | 702/3 |
| 7,483,408 B2 | 1/2009 | Bevan et al. | |
| 7,499,437 B2 | 3/2009 | Das et al. | |
| 7,590,083 B2 * | 9/2009 | Haugli et al. | 370/320 |
| 7,724,707 B2 | 5/2010 | Foster et al. | |
| 7,894,335 B2 * | 2/2011 | May | 370/219 |
| 7,916,649 B2 | 3/2011 | Buvaneswari et al. | |
| 7,970,574 B2 * | 6/2011 | Jin | 702/150 |
| 8,037,749 B2 * | 10/2011 | Araki | 73/170.16 |
| 8,111,630 B2 | 2/2012 | Kovvali et al. | |
| 8,115,145 B2 * | 2/2012 | Shariff et al. | 219/501 |
| 8,160,752 B2 * | 4/2012 | Weaver et al. | 700/295 |
| 8,229,699 B2 * | 7/2012 | Jin | 702/150 |
| 8,289,394 B2 * | 10/2012 | Kim | 348/159 |
| 8,385,220 B2 * | 2/2013 | Ryan | 370/252 |
| 8,407,162 B2 * | 3/2013 | Devitt et al. | 706/12 |
| 8,412,272 B2 * | 4/2013 | Fischer | 455/561 |
| 8,432,871 B1 | 4/2013 | Sarnaik et al. | |
| 8,479,271 B1 | 7/2013 | Berg et al. | |
| 8,493,898 B2 * | 7/2013 | Billau et al. | 370/310 |
| 8,520,615 B2 | 8/2013 | Mehta et al. | |
| 8,619,647 B2 * | 12/2013 | Billau et al. | 370/310 |
| 8,743,690 B1 | 6/2014 | Janarthanan et al. | |
| 8,792,353 B1 | 7/2014 | Janarthanan et al. | |
| 8,792,495 B1 | 7/2014 | Dixon et al. | |
| 2004/0146027 A1 | 7/2004 | Shinozaki et al. | |
| 2005/0168951 A1 * | 8/2005 | Hirafuji et al. | 361/700 |
| 2005/0204390 A1 | 9/2005 | Hofmann et al. | |
| 2005/0266799 A1 | 12/2005 | Hara et al. | |
| 2006/0050680 A1 | 3/2006 | Naim et al. | |
| 2007/0127443 A1 | 6/2007 | Spencer et al. | |
| 2007/0133394 A1 * | 6/2007 | Walton et al. | 370/216 |
| 2007/0147233 A1 * | 6/2007 | Asveren | 370/220 |
| 2008/0137541 A1 | 6/2008 | Agarwal et al. | |
| 2008/0267128 A1 | 10/2008 | Bennett et al. | |
| 2008/0293413 A1 | 11/2008 | Sharif-Ahmadi et al. | |
| 2009/0049152 A1 | 2/2009 | Rimhagen et al. | |
| 2009/0122712 A1 | 5/2009 | Sharif-Ahmadi et al. | |
| 2009/0141623 A1 | 6/2009 | Jung et al. | |
| 2009/0149200 A1 * | 6/2009 | Jayasinghe et al. | 455/456.3 |
| 2009/0232015 A1 | 9/2009 | Domschitz et al. | |
| 2010/0008341 A1 * | 1/2010 | Ulupinar et al. | 370/338 |
| 2010/0046418 A1 | 2/2010 | Horn et al. | |
| 2010/0130170 A1 | 5/2010 | Liu et al. | |
| 2010/0195621 A1 | 8/2010 | Kekki et al. | |
| 2010/0208658 A1 | 8/2010 | Vesterinen | |
| 2010/0228861 A1 * | 9/2010 | Arsovski et al. | 709/226 |
| 2011/0021186 A1 * | 1/2011 | Fischer | 455/424 |
| 2011/0070906 A1 | 3/2011 | Chami et al. | |
| 2011/0075675 A1 | 3/2011 | Koodli et al. | |
| 2011/0090042 A1 * | 4/2011 | Leonard et al. | 340/5.1 |
| 2011/0103310 A1 | 5/2011 | Stojanovski et al. | |
| 2011/0126111 A1 | 5/2011 | Gill et al. | |
| 2011/0223918 A1 | 9/2011 | Dahlen et al. | |
| 2011/0228750 A1 | 9/2011 | Tomici et al. | |
| 2011/0235595 A1 | 9/2011 | Mehta et al. | |
| 2011/0269456 A1 * | 11/2011 | Krishnaswamy et al. | 455/426.1 |
| 2012/0082073 A1 | 4/2012 | Andreasen et al. | |
| 2012/0082093 A1 | 4/2012 | Andreasen et al. | |
| 2012/0082094 A1 | 4/2012 | Andreasen et al. | |
| 2012/0082132 A1 | 4/2012 | Andreasen et al. | |
| 2012/0082146 A1 | 4/2012 | Andreasen et al. | |
| 2012/0129517 A1 * | 5/2012 | Fox et al. | 455/425 |
| 2012/0155366 A1 | 6/2012 | Zirwas et al. | |
| 2012/0188895 A1 | 7/2012 | Punz et al. | |
| 2012/0216243 A1 | 8/2012 | Gill et al. | |
| 2012/0224057 A1 | 9/2012 | Gill et al. | |
| 2012/0243432 A1 | 9/2012 | Liebsch et al. | |
| 2012/0244861 A1 | 9/2012 | Agarwal et al. | |
| 2013/0029708 A1 | 1/2013 | Fox et al. | |
| 2013/0039281 A1 | 2/2013 | Sarkar et al. | |
| 2013/0231156 A1 * | 9/2013 | Fischer | 455/552.1 |

FOREIGN PATENT DOCUMENTS

| | | |
|---|---|---|
| KR | 20030028054 A | 8/2003 |
| WO | 9946921 A2 | 9/1999 |
| WO | 2010130270 A1 | 11/2010 |
| WO | WO2011018235 A1 | 2/2011 |
| WO | 2011034476 A1 | 3/2011 |

OTHER PUBLICATIONS

Kundalkar et al., "LIPA: Local IP Access via Home Node B", Nov. 13, 2009.

Falconetti et al., "Distributed Uplink Macro Diversity for Cooperating Base Stations," published Jun. 14, 2009 at ICC Workshops 2009, IEEE.

Pending U.S. Patent Application entitled "Mobile Network Services in a Mobile Data Network", U.S. Appl. No. 13/233,812, filed Sep. 15, 2011 by Bruce O. Anthony, Jr. et al.

Pending U.S. Patent Application entitled "Macro Diversity in a Mobile Data Network With Edge Breakout", U.S. Appl. No. 13/233,880, filed Sep. 15, 2011 by Ronald L. Billau et al.

* cited by examiner

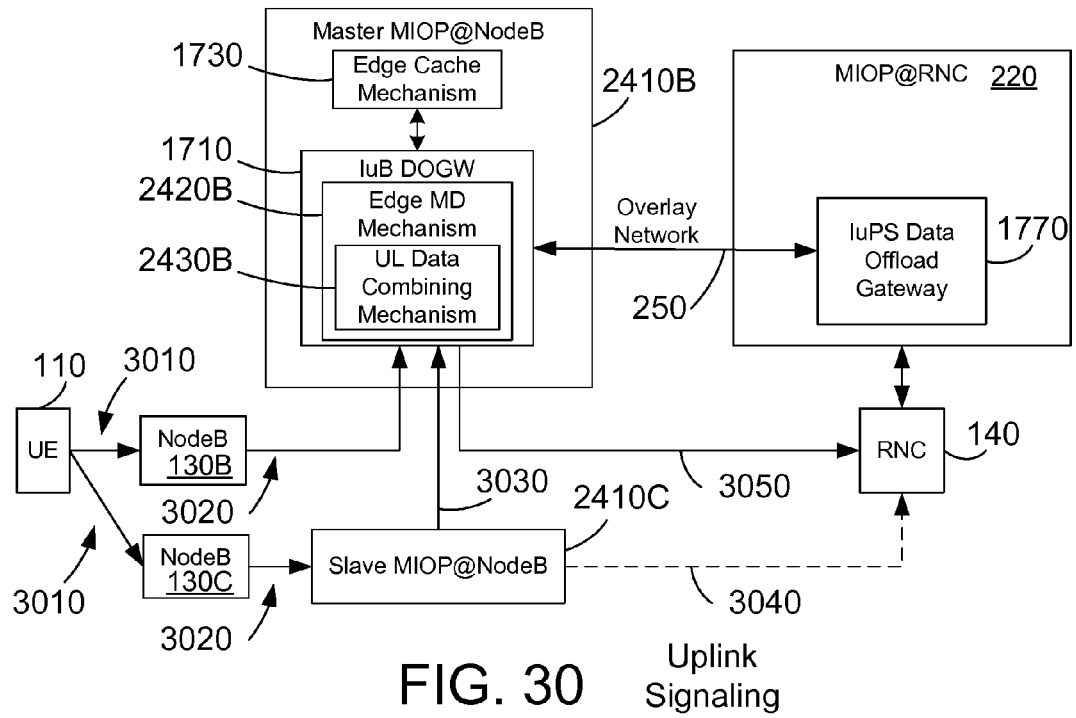
FIG. 30  Uplink Signaling
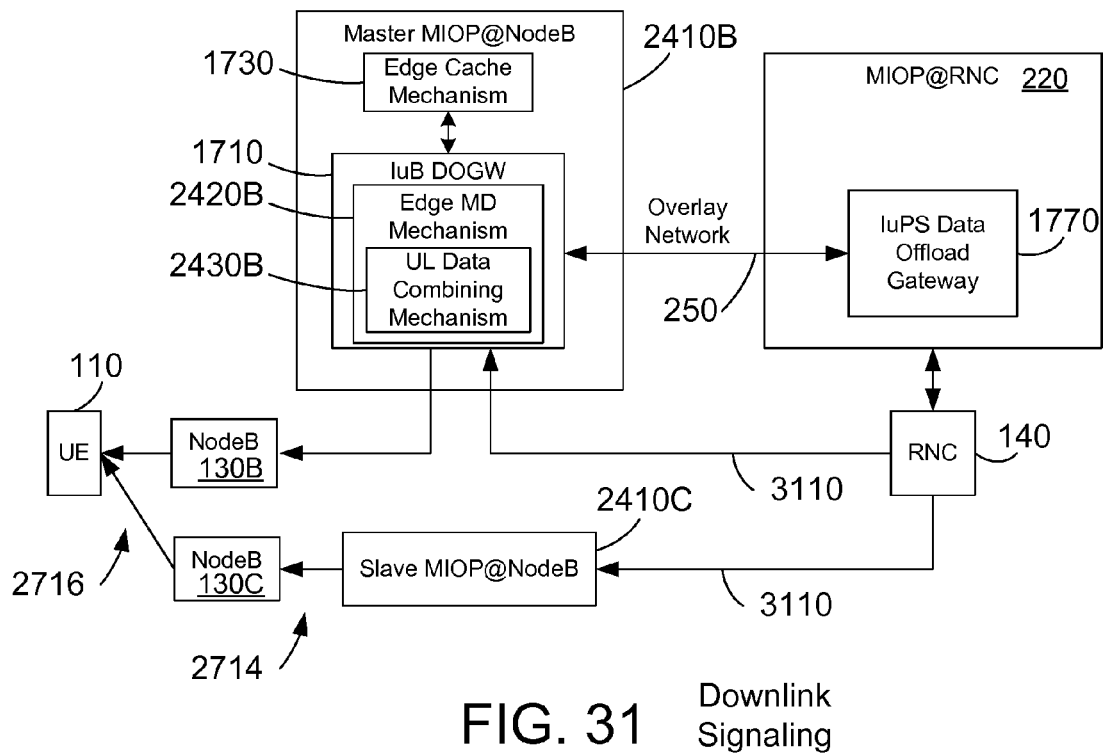
FIG. 31  Downlink Signaling

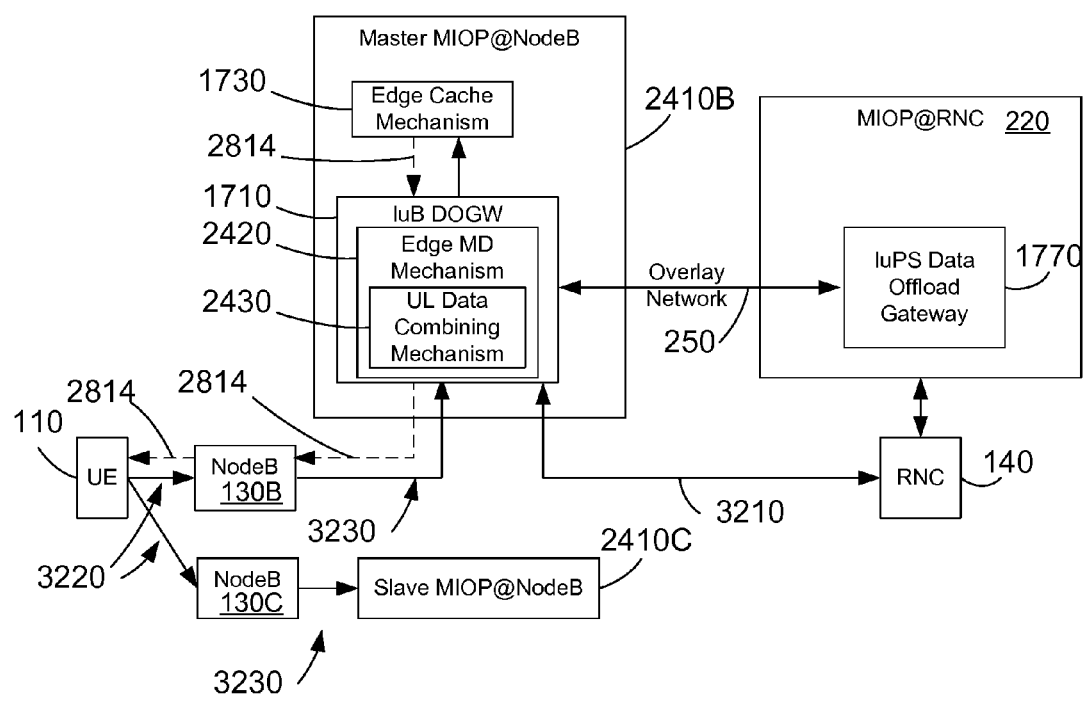
FIG. 32  Uplink/Downlink User Data

3712A

Historical (Failure) Data

| Date | Time | Load | Temp | Humidity | Condition | Wind | Failure |
|---|---|---|---|---|---|---|---|
| 01/01/2011 | 23:57 | 25 | -30F | 10% | Frigid | 0-5mph | Electrical |
| 01/02/2011 | 01:00 | 63 | -31F | 12% | Frigid | 0-5mph | Electrical |
| 01/03/2011 | 02:36 | 29 | -29F | 9% | Frigid | 0-5mph | Electrical |
| 01/04/2011 | 01:17 | 44 | -30F | 13% | Frigid | 0-5mph | Electrical |
| .... | | | | | | | |
| 07/30/2011 | 15:47 | 43 | 100F | 90% | Hot/Humid | 10-15mph | Thermal |
| 07/31/2011 | 14:50 | 87 | 97F | 95% | Hot/Humid | 0-5mph | Thermal |
| 08/01/2011 | 15:20 | 55 | 98F | 90% | Hot/Humid | 0-5mph | Thermal |

Column labels: 3810, 3812, 3814, 3816, 3818, 3820, 3822, 3824

Historical (Load) Data

| Date | Time | Load | Ex Temp | Internal Temp | Humidity | Wind |
|---|---|---|---|---|---|---|
| 08/01/2011 | 15:20 | 55 | 98F | 120F | 85% | 0-5mph |
| 08/01/2011 | 15:20 | 100 | 98F | 125F | 76% | 0-5mph |
| 08/01/2011 | 15:10 | 100 | 89F | 110F | 72% | 0-5mph |
| 08/08/2011 | 15:05 | 100 | 91F | 114F | 71% | 0-5mph |

Column labels: 3810, 3812, 3814, 3826, 3828, 3818, 3822

FIG. 38B

Historical (Usage) Data

3712C

| Customer | Data Type | Data Rate | Date | Time |
|---|---|---|---|---|
| 1 | Streaming Video | 5mB/sec | 07/01/2011 | 13:20 |
| 2 | Page data | 1 mB/sec | 08/10/2011 | 12:22 |
| 3 | Social Networking | 1mB/sec | 08/12/2011 | 11:15 |
| | | | | |

FIG. 38C

Historical Data Patterns

3717

| Trend | Load | Condition | Temp | Humidity | Failure | Period |
|---|---|---|---|---|---|---|
| 1 | | Frigid | < -30F | < 12% | Electrical | |
| 2 | | Hot/Humid | 97F | 90% | Thermal | |
| 3 | 100 | Critical Data Rate | 98F | | | |
| 4 | 100 | High Data Period | | | | Sun. 7:00Pm |

FIG. 39

MITIGATING EFFECTS OF PREDICTED FAILURES IN A MOBILE NETWORK BASESTATION DUE TO WEATHER

BACKGROUND

1. Technical Field

This disclosure generally relates to mobile phone systems, and more specifically relates to mitigating the effects of predicted failures in a mobile network basestation due to weather conditions.

2. Background Art

Mobile phones have evolved into "smart phones" that allow a user not only to make a call, but also to access data, such as e-mails, the internet, etc. Mobile phone networks have evolved as well to provide the data services that new mobile devices require. For example, 3G networks cover most of the United States, and allow users high-speed wireless data access on their mobile devices. In addition, phones are not the only devices that can access mobile data networks. Many mobile phone companies provide equipment and services that allow a subscriber to plug a mobile access card into a Universal Serial Bus (USB) port on a laptop computer, and provide wireless internet to the laptop computer through the mobile data network. In addition, some newer mobile phones allow the mobile phone to function as a wireless hotspot, which supports connecting several laptop computers or other wireless devices to the mobile phone, which in turn provides data services via the mobile data network. As time marches on, the amount of data served on mobile data networks will continue to rise exponentially.

Mobile data networks include very expensive hardware and software, so upgrading the capability of existing networks is not an easy thing to do. It is not economically feasible for a mobile network provider to simply replace all older equipment with new equipment due to the expense of replacing the equipment. For example, the next generation wireless network in the United States is the 4G network. Many mobile data network providers are still struggling to get their entire system upgraded to provide 3G data services. Immediately upgrading to 4G equipment is not an economically viable option for most mobile data network providers. In many locations, portions of the mobile data network are connected together by point to point microwave links. These microwave links have limited bandwidth. To significantly boost the throughput of these links requires the microwave links to be replaced with fiber optic cable but this option is very costly.

In a mobile data network there are many basestations with an associated cell phone tower. Many of these basestations are located remotely where it is difficult or dangerous for humans to access. The widely dispersed basestations experience broad climate variations that may result in a temporary hardware failure or complete failure until the basestation can be serviced. As currently designed, the core network and Radio Network Controller (RNC) wait until a failure occurs (e.g., the RNC is unable to contact the tower), and only then are recovery actions initiated. This can result in unnecessary delays in data traffic as the network recovers. Users within range of the tower may experience degradation and/or loss of service when this occurs.

BRIEF SUMMARY

Basestation equipment in a mobile data network is subject to harsh environmental conditions at many remote locations. International Business Machines Corporation (IBM) has introduced a Mobile Internet Optimization Platform (MIOP) appliance, referred herein as the MIOP@NodeB. This appliance is placed at the edge or basestation of a mobile data network to provide a platform for hosting applications and enhancing mobile network services. The introduction of an edge appliance provides a platform for additional reliability functions. As described herein, a predictive failure mechanism in the basestation appliance mitigates the effects of predicted failures in a mobile network basestation due to weather conditions. The predictive failure mechanism considers historical data, ambient environmental conditions, weather alerts and weather forecasts to take pre-emptive action to avert partial or total failure of the basestation equipment.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 30 is a block diagram illustrating an example of uplink signaling communication between a slave base station and a master basestation, and then to the RNC for macro diversity at the edge with breakout at the edge;

FIG. 31 is a block diagram illustrating an example of downlink signaling communication between the RNC and multiple NodeBs;

FIG. 32 is a block diagram illustrating an example of downlink user data communication the RNC and multiple NodeBs;

Figure 40:
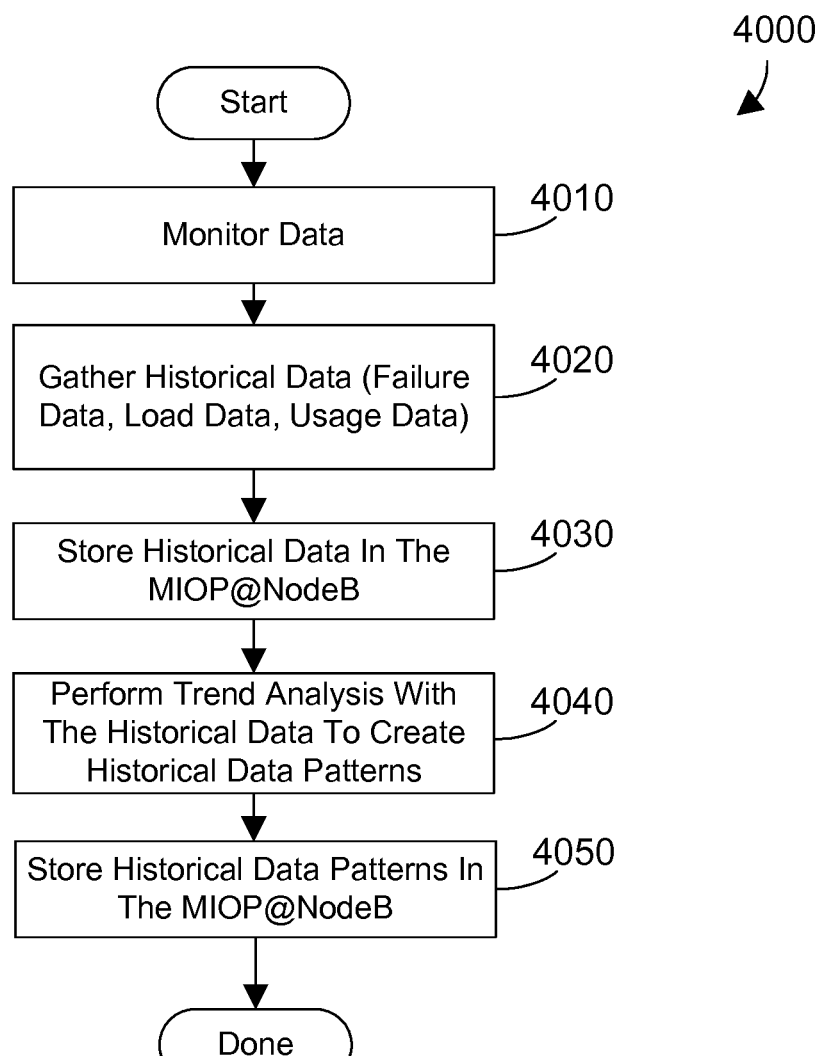
Figure 41:
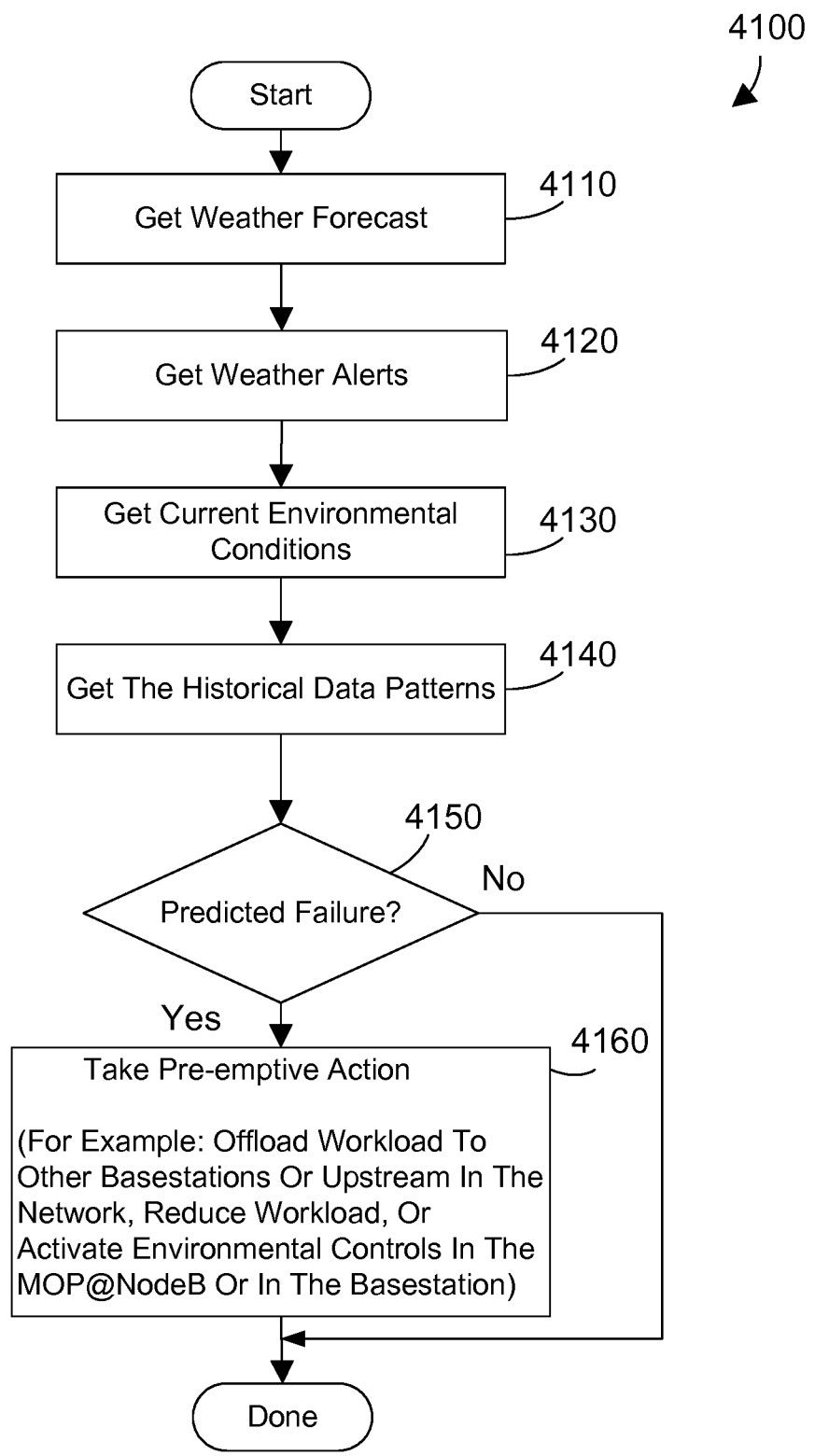

FIG. 38A-C are tables of historical data that are gathered by the predictive failure mechanism to be used to take preemptive actions against failure;

FIG. 39 is a table of historical data patterns created by the predictive failure mechanism;

FIG. 40 is a flow diagram of a method for creating historical usage patterns; and FIG. 41 is a flow diagram of a method for mitigating the effects of failures due to weather conditions in a mobile network basestation.

DETAILED DESCRIPTION

The claims and disclosure herein provide a predictive failure mechanism in the basestation appliance that mitigates the effects of failures in a mobile network basestation due to weather conditions. The predictive failure mechanism considers historical data, ambient environmental conditions, weather alerts and weather forecasts to take pre-emptive action to avert partial or total failure of the basestation equipment. This historical data may include historical failure data, historical load data and historical usage data patterns.

Figure 1:
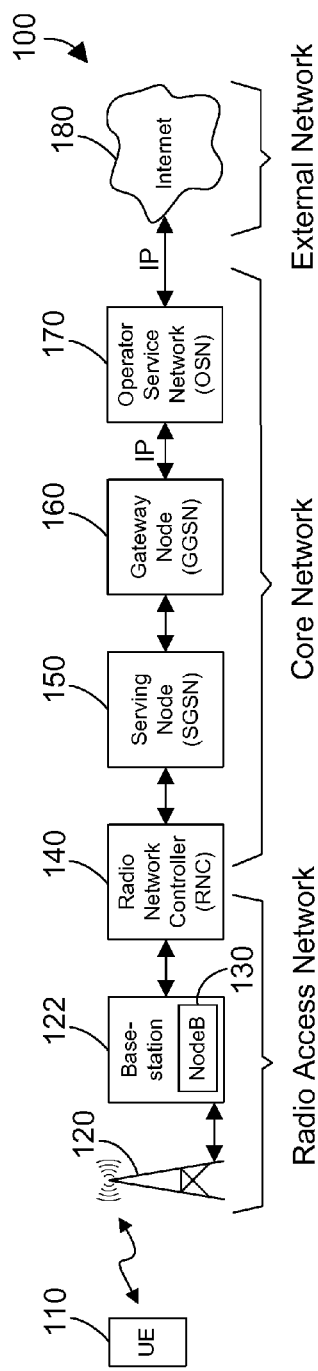
FIG. 1 is a block diagram of a prior art mobile data network.

Referring to FIG. 1, a prior art mobile data network 100 is shown. Mobile data network 100 is representative of known 3G networks. The mobile data network 100 preferably includes a radio access network (RAN), a core network, and an external network, as shown in FIG. 1. The radio access network includes the tower 120, basestation 122 with its corresponding NodeB 130, and a radio interface on a radio network controller (RNC) 140. The core network includes a network interface on the radio network controller 140, the serving node 150, gateway node 160 and operator service network 170 (as part of the mobile data network). The external network includes any suitable network. One suitable example for an external network is the internet 180, as shown in the specific example in FIG. 1.

In mobile data network 100, user equipment 110 communicates via radio waves to a tower 120. User equipment 110 may include any device capable of connecting to a mobile data network, including a mobile phone, a tablet computer, a mobile access card coupled to a laptop computer, etc. The tower 120 communicates via network connection to a basestation 122. Each basestation 122 includes a NodeB 130, which communicates with the tower 120 and the radio network controller 140. Note there is a fan-out that is not represented in FIG. 1. Typically there are tens of thousands of towers 120. Each tower 120 typically has a corresponding base station 122 with a NodeB 130 that communicates with the tower. However, network communications with the tens of thousands of base stations 130 are performed by hundreds of radio network controllers 140. Thus, each radio network controller 140 can service many NodeBs 130 in basestations 122. There may also be other items in the network between the basestation 130 and the radio network controller 140 that are not shown in FIG. 1, such as concentrators (points of concentration) or RAN aggregators that support communications with many basestations.

The radio network controller 140 communicates with the serving node 150. In a typical 3G network, the serving node 150 is an SGSN, which is short for Service GPRS Support Node, where GPRS stands for general packet radio service. The serving node 150 mediates access to network resources on behalf of mobile subscribers and implements the packet scheduling policy between different classes of quality of service. It is also responsible for establishing the Packet Data Protocol (PDP) context with the gateway node 160 for a given subscriber session. The serving node 150 is responsible for the delivery of data packets from and to the basestations within its geographical service area. The tasks of the serving node 150 include packet routing and transfer, mobility management (attach/detach and location management), logical link management, and authentication and charging functions. The serving node 150 stores location information and user profiles of all subscribers registered with the serving node 150. Functions the serving node 150 typically performs include GPRS tunneling protocol (GTP) tunneling of packets, performing mobility management as user equipment moves from one basestation to the next, and billing user data.

In a typical 3G network, the gateway node 160 is a GGSN, which is short for gateway GPRS support node. The gateway node 160 is responsible for the interworking between the core network and external networks. From the viewpoint of the external networks 180, gateway node 160 is a router to a sub-network, because the gateway node 160 "hides" the core network infrastructure from the external network. When the gateway node 160 receives data from an external network (such as internet 180) addressed to a specific subscriber, it forwards the data to the serving node 150 serving the subscriber. For inactive subscribers paging is initiated. The gateway node 160 also handles routing packets originated from the user equipment 110 to the appropriate external network. As anchor point the gateway node 160 supports the mobility of the user equipment 110. In essence, the gateway node 160 maintains routing necessary to tunnel the network packets to the serving node 150 that services a particular user equipment 110.

The gateway node 160 converts the packets coming from the serving node 150 into the appropriate packet data protocol (PDP) format (e.g., IP or X.25) and sends them out on the corresponding external network. In the other direction, PDP addresses of incoming data packets from the external network 180 are converted to the address of the subscriber's user equipment 110. The readdressed packets are sent to the responsible serving node 150. For this purpose, the gateway node 160 stores the current serving node address of the subscriber and his or her profile. The gateway node 160 is responsible for IP address assignment and is the default router for the subscriber's user equipment 110. The gateway node 160 also performs authentication, charging and subscriber policy functions. One example of a subscriber policy function is "fair use" bandwidth limiting and blocking of particular traffic types such as peer to peer traffic. Another example of a subscriber policy function is degradation to a 2G service level for a prepaid subscriber when the prepaid balance is zero.

A next hop router located in the operator service network (OSN) 170 receives messages from the gateway node 160, and routes the traffic either to the operator service network 170 or via an internet service provider (ISP) towards the internet 180. The operator service network 170 typically includes business logic that determines how the subscriber can use the mobile data network 100. The business logic that provides services to subscribers may be referred to as a "walled garden", which refers to a closed or exclusive set of services provided for subscribers, including a carrier's control over applications, content and media on user equipment.

Devices using mobile data networks often need to access an external network, such as the internet 180. As shown in FIG. 1, when a subscriber enters a request for data from the internet, that request is passed from the user equipment 110 to tower 120, to NodeB 130 in basestation 122, to radio network controller 140, to serving node 150, to gateway node 160, to operator service network 170, and to internet 180. When the requested data is delivered, the data traverses the entire network from the internet 180 to the user equipment 110. The capabilities of known mobile data networks 100 are taxed by the ever-increasing volume of data being exchanged between user equipment 110 and the internet 180 because all data between the two have to traverse the entire network.

Some efforts have been made to offload internet traffic to reduce the backhaul on the mobile data network. For example, some mobile data networks include a node called a HomeNodeB that is part of the radio access network. Many homes have access to high-speed Internet, such as Direct Subscriber Line (DSL), cable television, wireless, etc. For example, in a home with a DSL connection, the HomeNodeB takes advantage of the DSL connection by routing Internet traffic to and from the user equipment directly to the DSL connection, instead of routing the Internet traffic through the mobile data network. While this may be an effective way to offload Internet traffic to reduce backhaul, the HomeNodeB architecture makes it difficult to provide many mobile network services such as lawful interception, mobility, and charging consistently with the 3G or 4G mobile data network.

Figure 2:
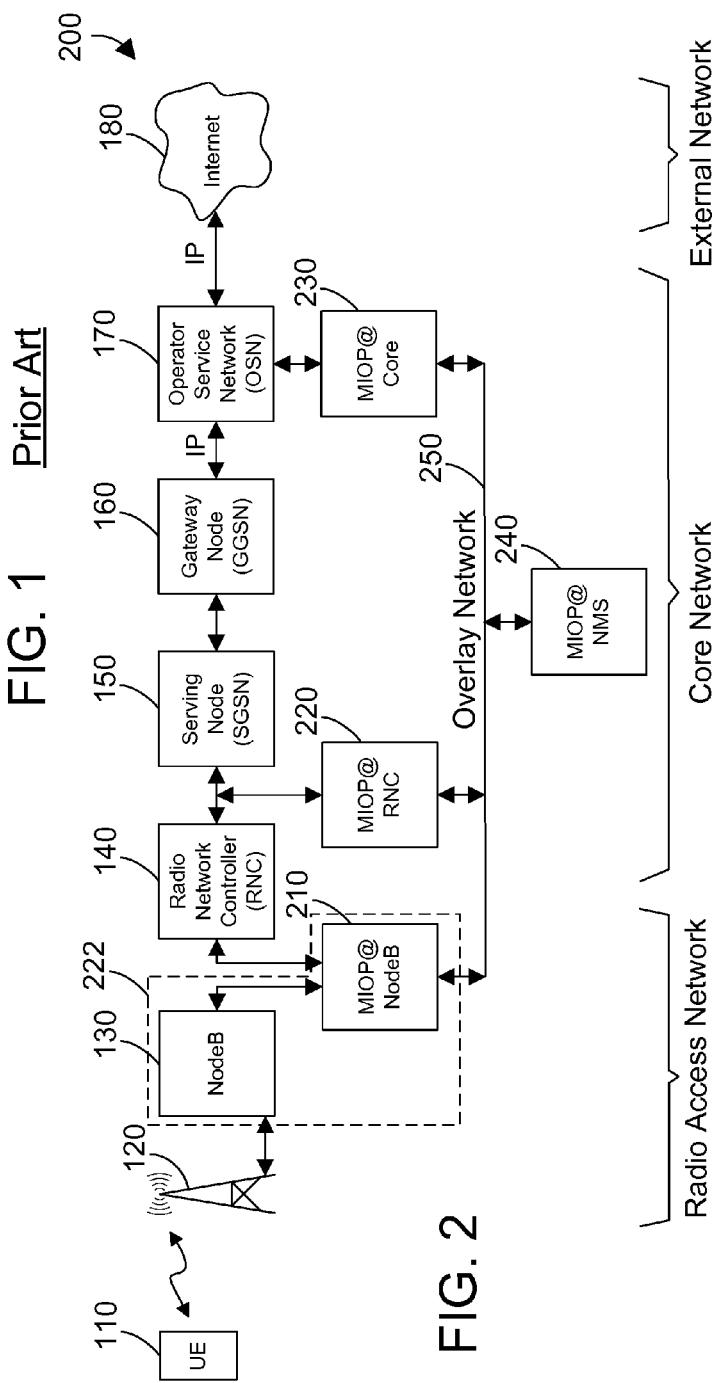
FIG. 2 is a block diagram of a mobile data network that includes first, second and third service mechanisms that all communicate via an overlay network.

Referring to FIG. 2, a mobile data network 200 includes mechanisms that provide various services for the mobile data network in a way that is transparent to most of the existing equipment in the mobile data network. FIG. 2 shows user equipment 110, tower 120, NodeB 130, radio network controller 140, serving node 150, gateway node 160, operator service node 170, and internet 180, the same as shown in FIG. 1. The additions to the mobile data network 200 when compared with the prior art mobile data network 100 in FIG. 1 include the addition of three components that may provide mobile network services in the mobile data network, along with a network management mechanism to manage the three components. The mobile network services are performed by what is called herein a Mobile Internet Optimization Platform (MIOP), and the mobile network services performed by the Mobile Internet Optimization Platform are referred to herein as MIOP services. The three MIOP components that provide these mobile network services are shown in FIG. 2 as MIOP@NodeB 210, MIOP@RNC 220 and MIOP@Core 230. A network management system shown as MIOP@NMS 240 manages the overall solution by: 1) managing the function of the three MIOP components 210, 220 and 230; 2) determining which MIOP@NodeBs in the system aggregate to which MIOP@RNCs via the overlay network for performance, fault and configuration management; and 3) monitoring performance of the MIOP@NodeBs to dynamically change and configure the mobile network services. The MIOP@NodeB 210, MIOP@RNC 220, MIOP@Core 230, MIOP@NMS 240, and the overlay network 250, and any subset of these, and are referred to herein as MIOP components.

The mobile network services provided by MIOP@NodeB 210, MIOP@RNC 220, and MIOP@Core 230 include any suitable services on the mobile data network, such as data optimizations, RAN-aware services, subscriber-aware services, edge-based application serving, edge-based analytics, etc. All mobile network services performed by all of MIOP@NodeB 210, MIOP@RNC 220, and MIOP@Core 230 are included in the term MIOP services as used herein. In addition to the services being offer in the MIOP components MIOP@NodeB 210, MIOP@RNC 220, and MIOP@Core 230, the various MIOP services could also be provided in a cloud based manner.

MIOP@NodeB 210 includes a first service mechanism and is referred to as the "edge" based portion of the MIOP solution. MIOP@NodeB 210 resides in the radio access network and has the ability to intercept all traffic to and from the NodeB 130. MIOP@NodeB 210 preferably resides in the base station 222 shown by the dotted box in FIG. 2. Thus, all data to and from the NodeB 130 to and from the radio network controller 140 is routed through MIOP@NodeB 210. MIOP@NodeB performs what is referred to herein as breakout of data on the intercepted data stream. MIOP@NodeB monitors the signaling traffic between NodeB and RNC and on connection setup intercepts in particular the setup of the transport layer (allocation of the UDP Port, IP address or AAL2 channel). For registered sessions the breakout mechanism 410 will be configured in a way that all traffic belonging to this UDP Port, IP address to AAL2 channel will be forwarded to an data offload function. MIOP@NodeB 210 thus performs breakout of data by defining a previously-existing path in the radio access network for non-broken out data, by defining a new second data path that did not previously exist in the radio access network for broken out data, identifying data received from a corresponding NodeB as data to be broken out, sending the data to be broken out on the second data path, and forwarding other data that is not broken out on the first data path. The signaling received by MIOP@NodeB 210 from NodeB 130 is forwarded to RNC 140 on the existing network connection to RNC 140, even though the data traffic is broken out. Thus, RNC 140 sees the signaling traffic and knows the subscriber session is active, but does not see the user data that is broken out by MIOP@NodeB 210. MIOP@NodeB thus performs two distinct functions depending on the monitored data packets: 1) forward the data packets to RNC 140 for signaling traffic and user data that is not broken out (including voice calls); and 2) re-route the data packets for user data that is broken out.

Once MIOP@NodeB 210 breaks out user data it can perform any suitable service based on the traffic type of the broken out data. Because the services performed by MIOP@NodeB 210 are performed in the radio access network (e.g., at the basestation 222), the MIOP@NodeB 210 can service the user equipment 110 much more quickly than can the radio network controller 140. In addition, by having a MIOP@NodeB 210 that is dedicated to a particular NodeB 130, one MIOP@NodeB only needs to service those subscribers that are currently connected via a single NodeB. The radio network controller, in contrast, which typically services dozens or even hundreds of basestations, must service all the subscribers accessing all basestations it controls from a remote location. As a result, MIOP@NodeB is in a much better position to provide services that will improve the quality of service and experience for subscribers than is the radio network controller.

Breaking out data in the radio access network by MIOP@NodeB 210 allows for many different types of services to be performed in the radio access network. These services may include optimizations that are similar to optimizations provided by known industry solutions between radio network controllers and the serving node. However, moving these optimizations to the edge of the mobile data network will not only greatly improve the quality of service for subscribers, but will also provide a foundation for applying new types of services at the edge of the mobile data network, such as terminating machine-to-machine (MTM) traffic at the edge (e.g., in the basestation), hosting applications at the edge, and performing analytics at the edge.

MIOP@RNC 220 includes a second service mechanism in mobile data network 200. MIOP@RNC 220 monitors all communication between the radio network controller 140 and serving node 150. The monitored communications are all communications to and from the radio network controller and the rest of the core network. MIOP@RNC 220 may provide one or more services for the mobile data network. MIOP@RNC 220 preferably makes the decision of whether or not to allow breakout of data. If MIOP@RNC 220 decides to breakout data for a given subscriber session, it may send a message to MIOP@NodeB 210 authorizing breakout by MIOP@NodeB 210, or may decide to breakout the data at MIOP@RNC 220, depending on the configured breakout decision criteria and selected radio channel. Because messages to and from the core network establishing the PDP context for a given subscriber session are monitored by MIOP@RNC 220, the decision of whether or not to breakout data resides in the MIOP@RNC 220.

MIOP@Core 230 includes a third service mechanism in the mobile data network 200. MIOP@Core 230 may include all the same services as MIOP@RNC 220, or any suitable subset of those services. If the decision is made not to provide services at MIOP@NodeB 210 or MIOP@RNC 220, these same services plus more sophisticated services can be performed at MIOP@Core 230. Thus, mobile data network 200 provides flexibility by allowing a decision to be made of where to perform which services. Because MIOP@NodeB 210, MIOP@RNC 220 and MIOP@Core 230 preferably include some of the same services, the services between components may interact (e.g., MIOP@NodeB and MIOP@Core may interact to optimize TCP traffic between them), or the services may be distributed across the mobile data network (e.g., MIOP@NodeB performs breakout and provides services for high-speed traffic, MIOP@RNC performs breakout and provides services for low-speed traffic, and MIOP@Core provides services for non-broken out traffic). The MIOP system architecture thus provides a very powerful and flexible solution, allowing dynamic configuring and reconfiguring on the fly of which services are performed by the MIOP components and where. In addition, these services may be implemented taking advantage of existing infrastructure in a mobile data network.

MIOP@NMS 240 is a network management system that monitors and controls the functions of MIOP@NodeB 210, MIOP@RNC 220, and MIOP@Core 230. MIOP@NMS 240 preferably includes MIOP internal real-time or near real-time performance data monitoring to determine if historical or additional regional dynamic changes are needed to improve services on the mobile data network 200. MIOP@NMS 240 provides a user interface that allows a system administrator to operate and to configure how the MIOP components 210, 220 and 230 function.

The overlay network 250 allows MIOP@NodeB 210, MIOP@RNC 220, MIOP@Core 230, and MIOP@NMS 240 to communicate with each other. The overlay network 250 is preferably a virtual private network primarily on an existing physical network in the mobile data network. Thus, while overlay network 250 is shown in FIG. 2 separate from other physical network connections, this representation in FIG. 2 is a logical representation.

Figure 3:
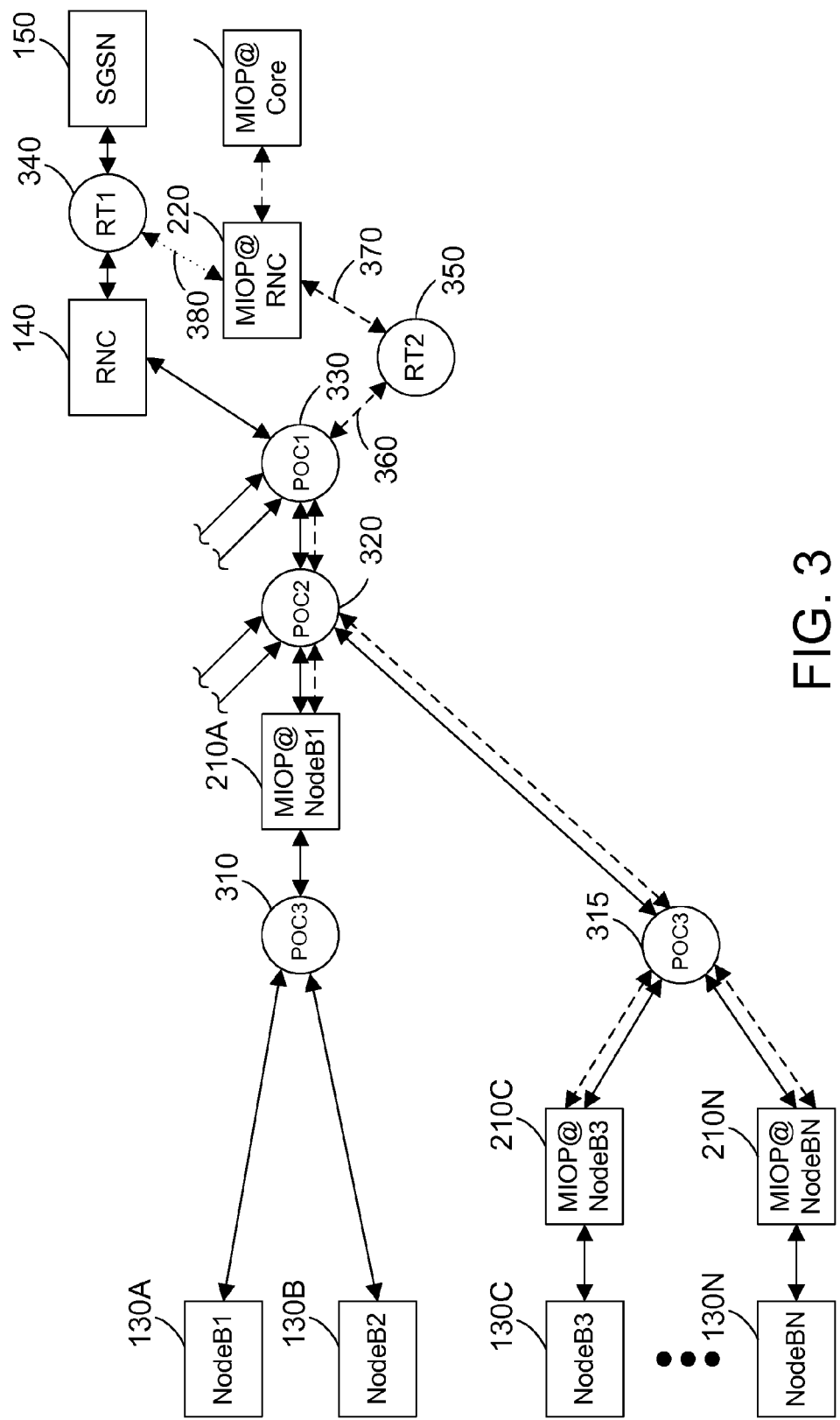
FIG. 3 is a block diagram of one possible implementation for parts of the mobile data network shown in FIG. 2 to illustrate the overlay network.

FIG. 3 shows one suitable implementation of a physical network and the overlay network in a sample mobile data system. The existing physical network in the mobile data network before the addition of the MIOP@NodeB 210, MIOP@RNC 220, and MIOP@Core 230 is shown by the solid lines with arrows. This specific example in FIG. 3 includes many NodeBs, shown in FIG. 1 as 130A, 130B, 130C, . . . , 130N. Some of the NodeBs have a corresponding MIOP@NodeB. FIG. 3 illustrates that MIOP@NodeBs (such as 210A and 210N) can be placed in a basestation with its corresponding NodeB, or can be placed upstream in the network after a point of concentration (such as 210A after POC3 310). FIG. 3 also illustrates that a single MIOP@NodeB such as MIOP@NodeB1 210A can service two different NodeBs, such as NodeB1 130A and NodeB2 130B. Part of the overlay network is shown by the dotted lines between MIOP@NodeB1 210A and second point of concentration POC2 320, between MIOP@NodeB3 210C and POC3 315, between MIOP@NodeBN 210N and POC3 315, and between POC3 315 and POC2 320. Note the overlay network in the radio access network portion is a virtual private network that is implemented on the existing physical network connections. The overlay network allows the MIOP@NodeBs 210A, 210C and 210N to communicate with each other directly, which makes some services possible in the mobile data network 200 that were previously impossible. FIG. 3 shows MIOP@NodeB1 210A connected to a second point of concentration POC2 320. The broken arrows coming in from above at POC2 320 represent connections to other NodeBs, and could also include connections to other MIOP@NodeBs. Similarly, POC2 320 is connected to a third point of concentration POC1 330, with possibly other NodeBs or MIOP@NodeBs connected to POC1. The RNC 140 is shown connected to POC1 330, and to a first router RT1 340 in the core network. The router RT1 340 is also connected to the SGSN 150. While not shown in FIG. 3 for the sake of simplicity, it is understood that SGSN in FIG. 3 is also connected to the upstream core components shown in FIG. 2, including GGSN 160, OSN 170 and internet 180.

As shown in FIG. 3, the overlay network from the NodeBs to POC1 330 is a virtual private network implemented on existing physical network connections. However, the overlay network requires a second router RT2 350, which is connected via a physical network connection 360 to POC1 330, and is connected via physical network connection 370 to MIOP@RNC 220. This second router RT2 350 may be a separate router, or may be a router implemented within MIOP@RNC 220. MIOP@RNC 220 is also connected to router RT1 340 via a physical network connection 380, and is also connected to MIOP@Core 230. Physical connection 380 in FIG. 3 is shown in a line with short dots because it is not part of the pre-existing physical network before adding the MIOP components (arrows with solid lines) and is not part of the overlay network (arrows with long dots). Note the connection from MIOP@RNC 220 to MIOP@Core 230 is via existing physical networks in the core network.

We can see from the configuration of the physical network and overlay network in FIG. 3 that minimal changes are needed to the existing mobile data network to install the MIOP components. The most that must be added is one new router 350 and three new physical network connections 360, 370 and 380. Once the new router 350 and new physical network connections 360, 370 and 380 are installed, the router 350 and MIOP components are appropriately configured, and the existing equipment in the mobile data network is configured to support the overlay network, the operation of the MIOP components is completely transparent to existing network equipment.

As can be seen in FIG. 3, data on the overlay network is defined on existing physical networks from the NodeBs to POC1. From POC1 the overlay network is on connection 360 to RT2 350, and on connection 370 to MIOP@RNC 220. Thus, when MIOP@NodeB 210 in FIG. 2 needs to send a message to MIOP@RNC 220, the message is sent by sending packets via a virtual private network on the physical network connections to POC1, then to RT2 350, then to MIOP@RNC 220. Virtual private networks are well-known in the art, so they are not discussed in more detail here.

Figure 4:
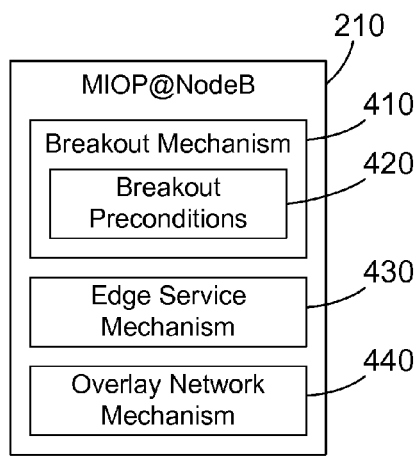
FIG. 4 is a block diagram of the MIOP@NodeB shown in FIG. 2, which includes a first service mechanism.

Referring to FIG. 4, MIOP@NodeB 210 preferably includes a breakout mechanism 410, an edge service mechanism 430, and an overlay network mechanism 440. The breakout mechanism 410 determines breakout preconditions 420 that, when satisfied, allow breakout to occur at this edge location. Breakout mechanism 410 in MIOP@NodeB 210 communicates with the breakout mechanism 510 in MIOP@RNC 220 shown in FIG. 5 to reach a breakout decision. The breakout mechanism 410, after receiving a message from MIOP@RNC 220 authorizing breakout on connection setup intercepts in particular the setup of the transport layer (allocation of the UDP Port, IP address or AAL2 channel). For authorized sessions the breakout mechanism 410 will be configured in a way that all traffic belonging to this UDP Port, IP address to AAL2 channel will be forwarded to a data offload function. For traffic that should not be broken out, the breakout mechanism 410 sends the data on the original data path in the radio access network. In essence, MIOP@NodeB 210 intercepts all communications to and from the basestation 130, and can perform services "at the edge", meaning at the edge of the radio access network that is close to the user equipment 110. By performing services at the edge, the services to subscribers may be increased or optimized without requiring hardware changes to existing equipment in the mobile data network.

The breakout mechanism 410 preferably includes breakout preconditions 420 that specify one or more criterion that must be satisfied before breakout of data is allowed. One suitable example of breakout preconditions is the speed of the channel. In one possible implementation, only high-speed channels will be broken out at MIOP@NodeB 210. Thus, breakout preconditions 420 could specify that subscribers on high-speed channels may be broken out, while subscribers on low-speed channels are not broken out at MIOP@NodeB 210. When the breakout preconditions 420 are satisfied, the MIOP@NodeB 210 registers the subscriber session with MIOP@RNC 220. This is shown in method 800 in FIG. 8. MIOP@NodeB 210 intercepts and monitors network traffic to and from NodeB (basestation) (step 810). When the traffic does not satisfy the breakout preconditions (step 820=NO), method 800 returns to step 810. When the traffic satisfies the breakout conditions (step 820=YES), MIOP@NodeB 210 sends a message to MIOP@RNC 220 on the overlay network 250 to register the subscriber session for breakout (step 830). With the subscriber session registered with MIOP@RNC 220, the MIOP@RNC 220 will determine whether or not to breakout data for the subscriber session, and where the breakout is done, as explained in more detail below.

Referring back to FIG. 4, MIOP@NodeB 210 also includes an edge service mechanism 430. The edge service mechanism 430 provides one or more services for the mobile data network 200. The edge service mechanism 430 may include any suitable service for the mobile data network including without limitation caching of data, data or video compression techniques, push-based services, charging, application serving, analytics, security, data filtering, new revenue-producing services, etc. The edge service mechanism is the first of three service mechanisms in the MIOP components. While the breakout mechanism 410 and edge service mechanism 430 are shown as separate entities in FIG. 4, the first service mechanism could include both breakout mechanism 410 and edge service mechanism 430.

MIOP@NodeB 210 also includes an overlay network mechanism 440. The overlay network mechanism 440 provides a connection to the overlay network 250 in FIG. 2, thereby allowing MIOP@NodeB 210 to communicate with MIOP@RNC 220, MIOP@Core 230, and MIOP@NMS 240. As stated above, the overlay network 250 is preferably a virtual private network primarily on an existing physical network in the mobile data network 200.

Figure 5:
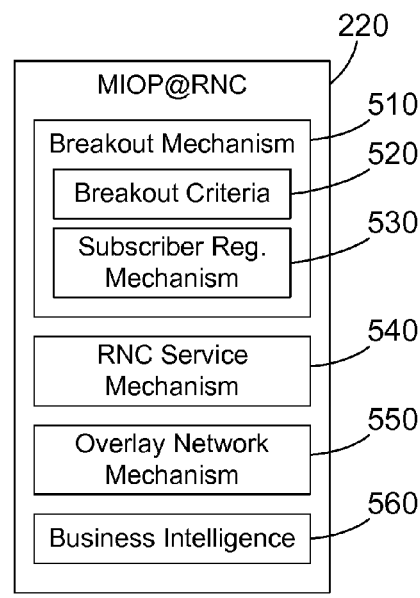
FIG. 5 is a block diagram of the MIOP@RNC shown in FIG. 2, which includes a second service mechanism.
Figure 8:
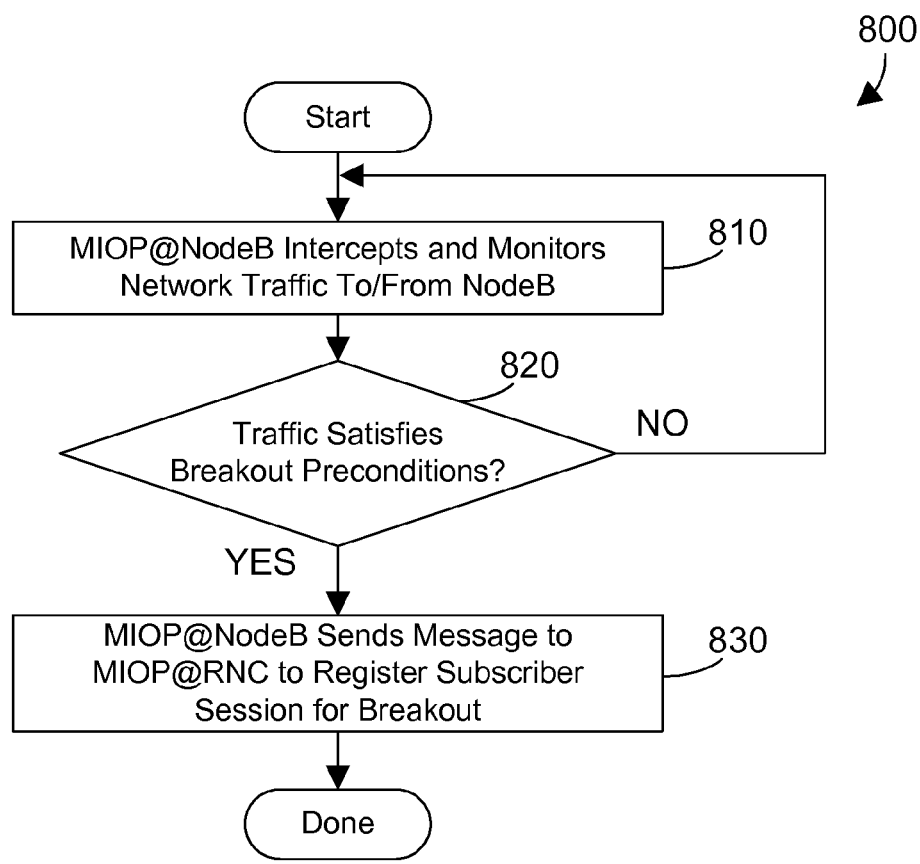
FIG. 8 is a flow diagram of a method performed by MIOP@NodeB shown in FIGS. 2 and 4.

Referring to FIG. 5, MIOP@RNC 220 preferably includes a breakout mechanism 510, an RNC service mechanism 540, an overlay network mechanism 550, and business intelligence 560. Breakout mechanism 510 includes breakout criteria 520 that specifies one or more criterion that, when satisfied, allows breakout of data. Subscriber registration mechanism 530 receives messages from MIOP@NodeB 210, and registers subscriber sessions for which the breakout preconditions 420 in MIOP@NodeB 210 are satisfied. When the breakout mechanism 510 determines the breakout criteria 520 is satisfied, the breakout mechanism 510 will then determine where the breakout should occur. When the breakout can occur at MIOP@NodeB 210, the MIOP@RNC 220 sends a message to MIOP@NodeB 210 on the overlay network 250 authorizing breakout at MIOP@NodeB 210. When the breakout should occur at MIOP@RNC 220, the breakout mechanism 510 in MIOP@RNC 220 performs the breakout as well for the traffic remaining there. This is shown in more detail in method 1000 in FIG. 10. MIOP@RNC monitors network traffic between the radio network controller 140 and the serving node 150 (step 1010). When the traffic does not satisfy the breakout criteria (step 1020=NO), method 1000 loops back to step 1010. When the network traffic satisfies the breakout criteria (step 1020=YES), the breakout mechanism 510 determines whether the subscriber session is registered for breakout (step 1030). A subscriber session is registered for breakout when the MIOP@NodeB 210 determined the traffic satisfied the breakout preconditions and registered the subscriber session for breakout, as shown in FIG. 8. Returning to FIG. 10, when the subscriber is registered for breakout (step 1030=YES), MIOP@RNC 220 sends a message via the overlay network 250 to MIOP@NodeB 210 authorizing breakout of traffic for the subscriber session (step 1040). MIOP@NodeB 210 may then breakout traffic for the subscriber session (step 1050). When the subscriber is not registered for breakout (step 1030=NO), method 1000 checks to see if MIOP@RNC is going to do breakout (step 1060). If not (step 1060=NO), method 1000 is done. When MIOP@RNC is going to do breakout (step 1060=YES), the traffic is then broken out at MIOP@RNC (step 1070).

Figure 10:
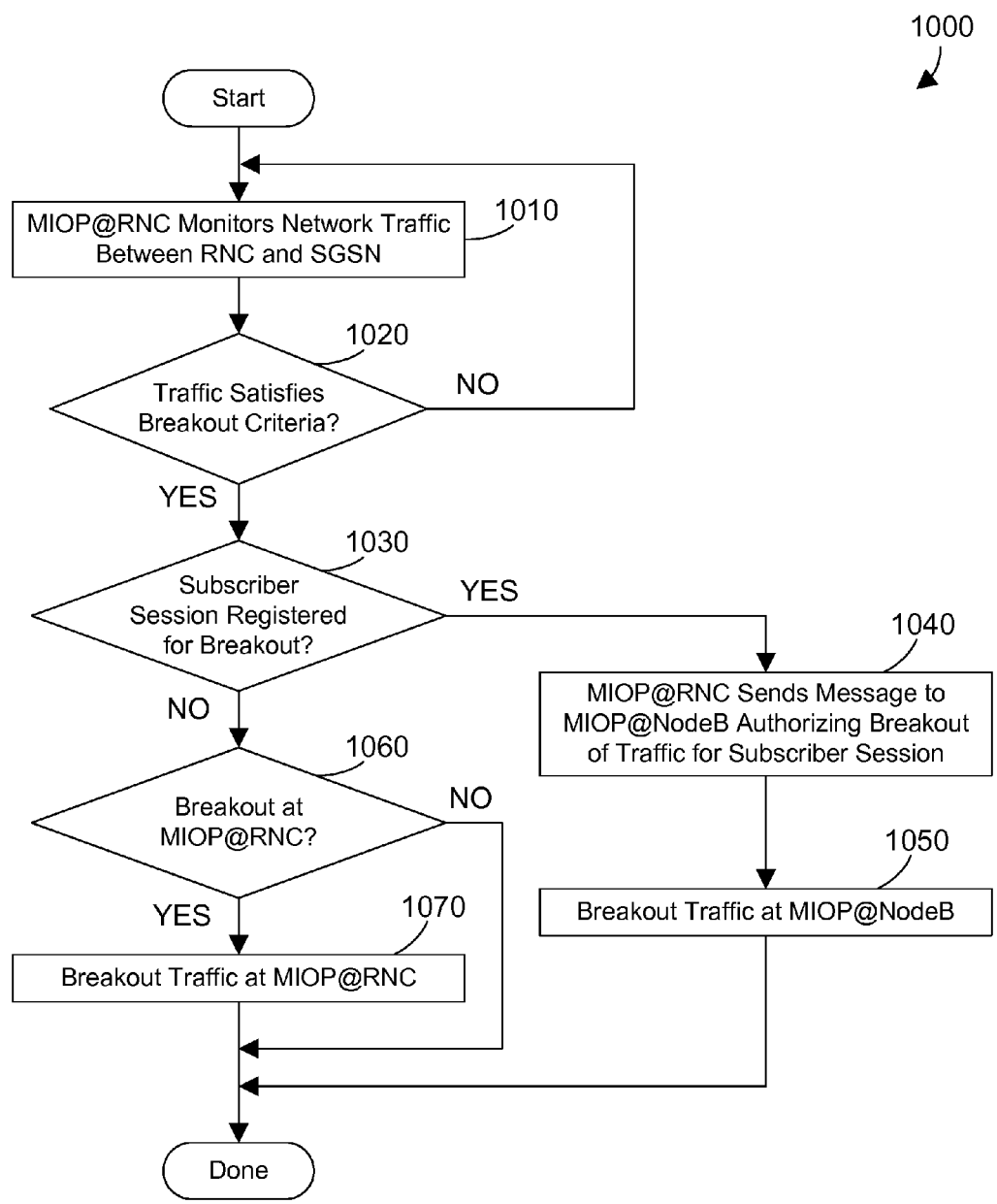
FIG. 10 is a flow diagram of a method for the MIOP@NodeB and MIOP@RNC to determine when to break out data.

In one specific example, the breakout preconditions specify only high-speed channels are broken out at MIOP@NodeB 210, and when the breakout preconditions are satisfied, the subscriber session is registered for breakout, as shown in FIG. 8. FIG. 10 illustrates that even when the breakout preconditions are not satisfied, breakout can still be performed at MIOP@RNC 220. Thus, even if the subscriber session is on a low-speed channel, if all the other breakout criteria are satisfied, breakout of the low-speed channel may be performed at MIOP@RNC 220. The mobile data network 200 thus provides great flexibility in determining when to do breakout and where.

Referring back to FIG. 5, the RNC service mechanism 540 provides one or more services for the mobile data network. RNC service mechanism 540 is the second of three service mechanisms in the MIOP components. The RNC service mechanism 540 may include any suitable service for the mobile data network, including without limitation caching of data, data or video compression techniques, push-based services, charging, application serving, analytics, security, data filtering, new revenue-producing services, etc.

While the breakout mechanism 510 and RNC service mechanism 540 are shown as separate entities in FIG. 5, the second service mechanism could include both breakout mechanism 510 and RNC service mechanism 540. The overlay network mechanism 550 is similar to the overlay network mechanism 440 in FIG. 4, providing a logical network connection to the other MIOP components on the overlay network 250 in FIG. 2. MIOP@RNC 220 also includes business intelligence 560, which includes:

1) historical subscriber information received from the mobile data network over time, such as mobility and location, volumes, traffic types, equipment used, etc.
2) network awareness, including NodeB load states, service area code, channel type, number of times channel type switching occurred for a PDP session, serving cell ID, how many cells and their IDs are in the active set, PDP context type, PDP sessions per subscriber, session duration, data consumption, list of Uniform Resource Locators (URLs) browsed for user classification, top URL browsed, first time or repeat user, entry point/referral URLs for a given site, session tracking, etc.
3) association of flow control procedures between NodeB and RNC to subscribers.

The business intelligence 560 may be instrumented by the RNC service mechanism 540 to determine when and what types of MIOP services to perform for a given subscriber. For example, services for a subscriber on a mobile phone may differ when compared to services for a subscriber using a laptop computer to access the mobile data network. In another example, voice over internet protocol (VOIP) session could have the data broken out.

Figure 6:
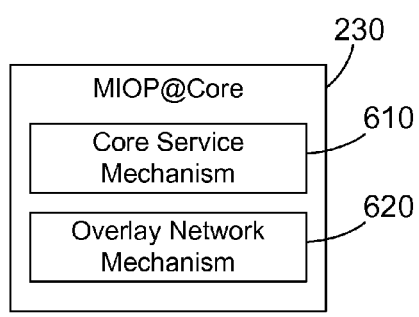
FIG. 6 is a block diagram of the MIOP@Core shown in FIG. 2, which includes a third service mechanism.

Referring to FIG. 6, the MIOP@Core 230 includes a core service mechanism 610 and an overlay network mechanism 620. Core service mechanism 610 provides one or more services for the mobile data network. Core service mechanism 610 is the third of three service mechanisms in the MIOP components. The core service mechanism 610 may include any suitable service for the mobile data network, including without limitation caching of data, data or video compression techniques, push-based services, charging, application serving, analytics, security, data filtering, new revenue-producing services, etc. In one specific implementation, the MIOP@Core 230 is an optional component, because all needed services could be performed at MIOP@NodeB 210 and MIOP@RNC 220. In an alternative implementation, MIOP@Core 230 performs some services, while MIOP@RNC performs others or none. The overlay network mechanism 620 is similar to the overlay network mechanisms 440 in FIGS. 4 and 550 in FIG. 5, providing a logical network connection to the other MIOP components on the overlay network 250 in FIG. 2.

Figure 7:
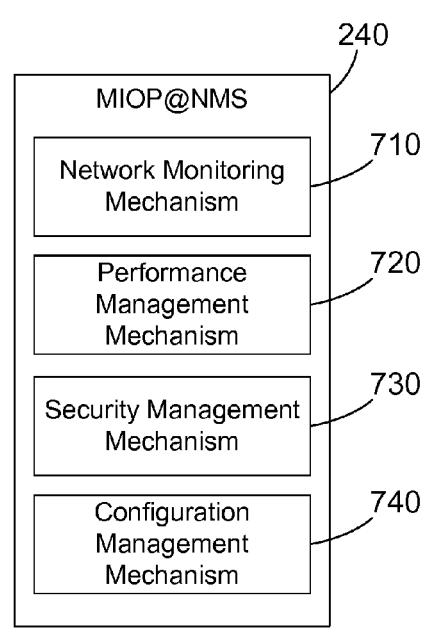
FIG. 7 is a block diagram of a management mechanism coupled to the overlay network that manages the functions of MIOP@NodeB, MIOP@RNC, and MIOP@Core.

Referring to FIG. 7, the MIOP@NMS 240 is a network management system that monitors and manages performance of the mobile data network 200, and controls the function of MIOP@NodeB 210, MIOP@RNC 220, and MIOP@Core 230. MIOP@NMS 240 preferably includes a network monitoring mechanism 710, a performance management mechanism 720, a security management mechanism 730, and a configuration management mechanism 740. The network monitoring mechanism 710 monitors network conditions, such as alarms, in the mobile data network 200. The performance management mechanism 720 can enable, disable or refine certain services by supporting the execution of services in real-time or near real-time, such as services that gather information to assess customer satisfaction. The security management mechanism 730 manages security issues in the mobile data network, such as intrusion detection or additional data privacy. The configuration management mechanism 740 controls and manages the configuration of MIOP@NodeB 210, MIOP@RNC 220, and MIOP@Core 230 in a way that allows them to dynamically adapt to any suitable criteria, including data received from the network monitoring mechanism, time of day, information received from business intelligence 560, etc.

Figure 9:
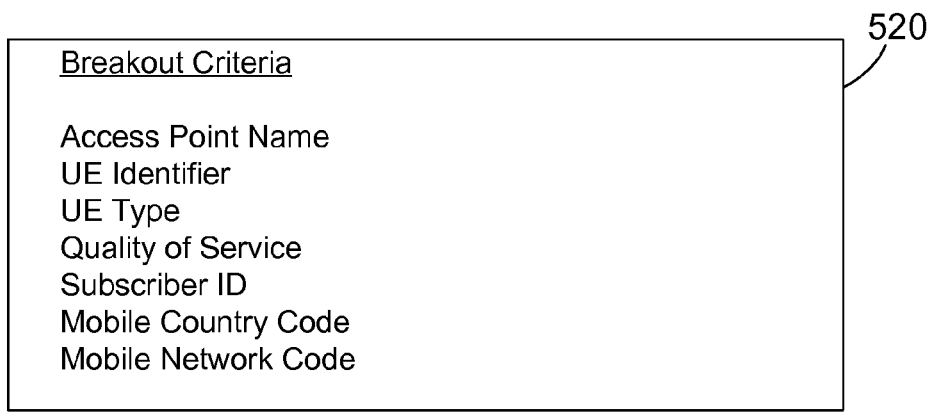
FIG. 9 is a block diagram showing breakout criteria MIOP@RNC may use in making a decision of whether or not to break out data.
Figure 11:
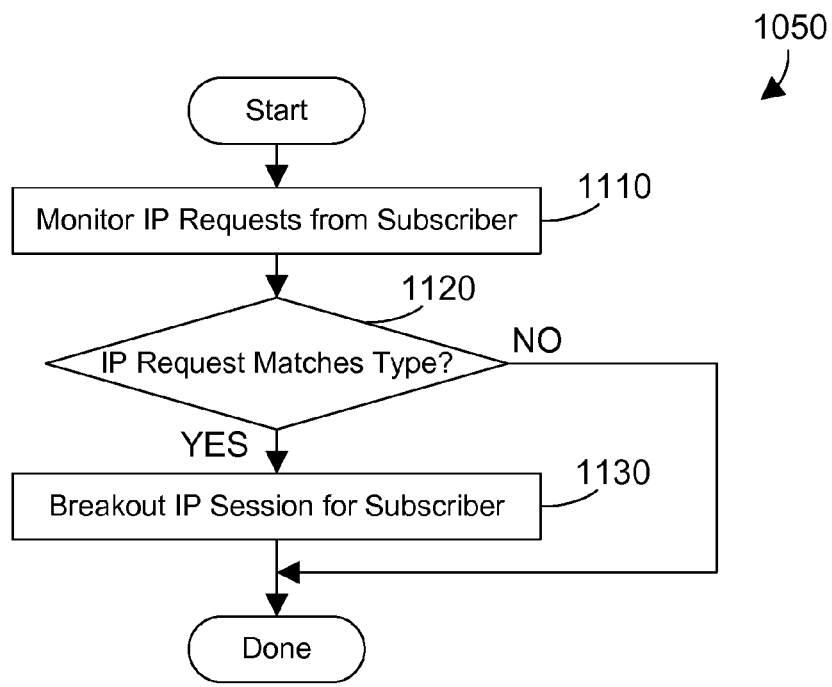
FIG. 11 is a flow diagram of a method for the first service mechanism in MIOP@NodeB to selectively break out data when break out for a specified subscriber session has been authorized.

FIG. 9 shows sample breakout criteria 520 shown in FIG. 5 and used in step 1020 in FIG. 10. Suitable breakout criteria 520 includes access point name, user equipment identifier, user equipment type, quality of service, subscriber ID, mobile country code, and mobile network code. For example, breakout criteria 520 could specify to perform MIOP services for the operator's subscribers, and not to perform MIOP services for roamers. In another example, the breakout criteria 520 could specify to break out only video requests. A static breakout decision will be performed during PDP Context Activation. Based on IP flows (e.g. shallow packet inspection of the IP 5 tuple) only specific IP flows maybe identified and broken out dynamically within that PDP subscriber session (e.g., VOIP traffic), as discussed in more detail below with respect to FIG. 11. Breakout criteria 520 expressly extends to any suitable criteria for making the breakout decision.

Referring again to FIG. 10, when the traffic satisfies the breakout criteria (step 1020=YES), and the subscriber session is registered for breakout (step 1030=YES), MIOP@RNC sends a message to MIOP@NodeB authorizing breakout of traffic for this subscriber session (step 1040). In response, MIOP@NodeB begins decrypting the bearer, examining the signaling and user IP traffic tunneled through it and may breakout the traffic for this subscriber session (step 1050). Note, however, MIOP@NodeB may still decide not to breakout all traffic based on other criteria, such as type of IP request the destination of the traffic or the OSI Layer 7 Application of the decrypted user traffic. Determination of the Application may be performed simply by inspection of the IP 5-tuple or optionally via inspection at layer 7 using Deep Packet Inspection (DPI) techniques. This is shown in the specific example in FIG. 11. Method 1050 in FIG. 10 is one suitable implementation of step 1050 in FIG. 10. MIOP@NodeB monitors IP requests from the subscriber (step 1110). When the user traffic IP request matches a specified type criteria (step 1120=YES), the IP session is broken out for the subscriber (step 1130). When the IP request does not match a specified criteria type (step 1120=NO), no breakout is performed. For example, let's assume that IP requests to access video over the RTP layer 7 Application Protocol are broken out so the video data may be cached in MIOP@NodeB 210, but other requests, such as Google searches, are not. The MIOP@NodeB monitors the IP requests from the subscriber (step 1110), and when the subscriber session IP request carries RTP traffic is for a video file (step 1120=YES), the IP session is broken out (step 1130). Otherwise, the IP session is not broken out at MIOP@NodeB. This is one simple example to illustrate additional flexibility and intelligence within MIOP@NodeB that may determine whether or not to perform breakout for a given subscriber session at the MIOP@NodeB after being authorized by MIOP@RNC to perform breakout for that subscriber session. Any suitable criteria could be used to determine what to breakout and when at MIOP@NodeB once MIOP@NodeB has been authorized for breakout in step 1040 in FIG. 10.

Figure 12:
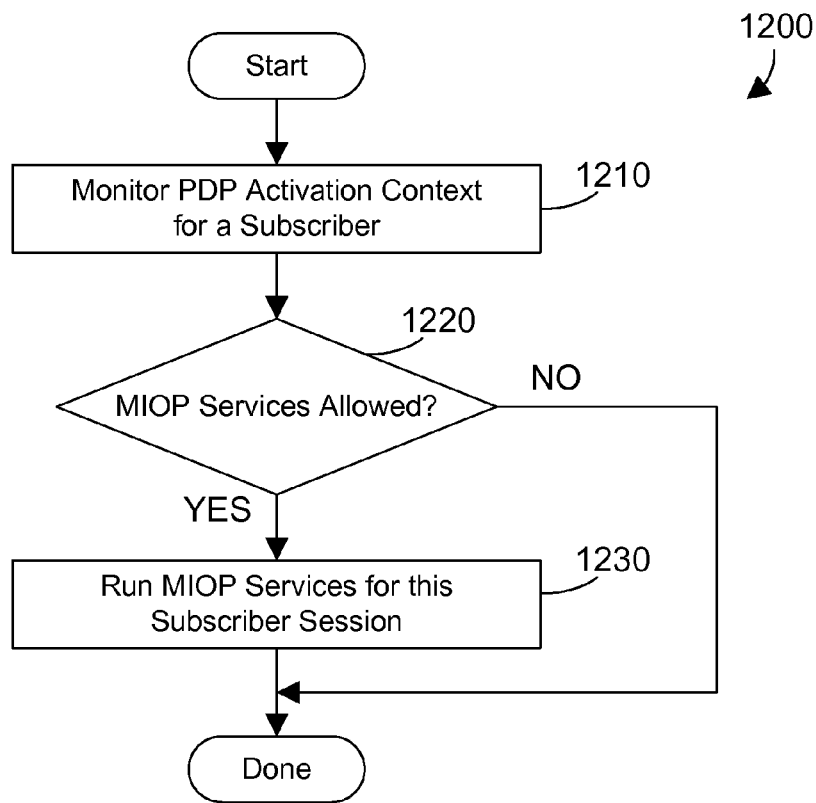
FIG. 12 is a flow diagram of a method for determining when to run MIOP services for a specified subscriber session.

Referring to FIG. 12, method 1200 shows a method for determining when to run MIOP services. The Packet Data Protocol (PDP) activation context for a subscriber is monitored (step 1210). A PDP activation context is established when user equipment 110 connects to tower 120 and the subscriber runs an application that triggers the PDP activation procedure. The core network will determine the subscriber, and perhaps corresponding user equipment. When MIOP services are allowed (step 1220=YES), services for this subscriber session are run (step 1230) upon the arrival of data from the subscriber. When MIOP services are not allowed (step 1220=NO), no MIOP services are run. In one simple example, MIOP services in the mobile data network are allowed for authorized subscribers, but are not allowed for subscribers from a different wireless company that are roaming.

Figure 13:
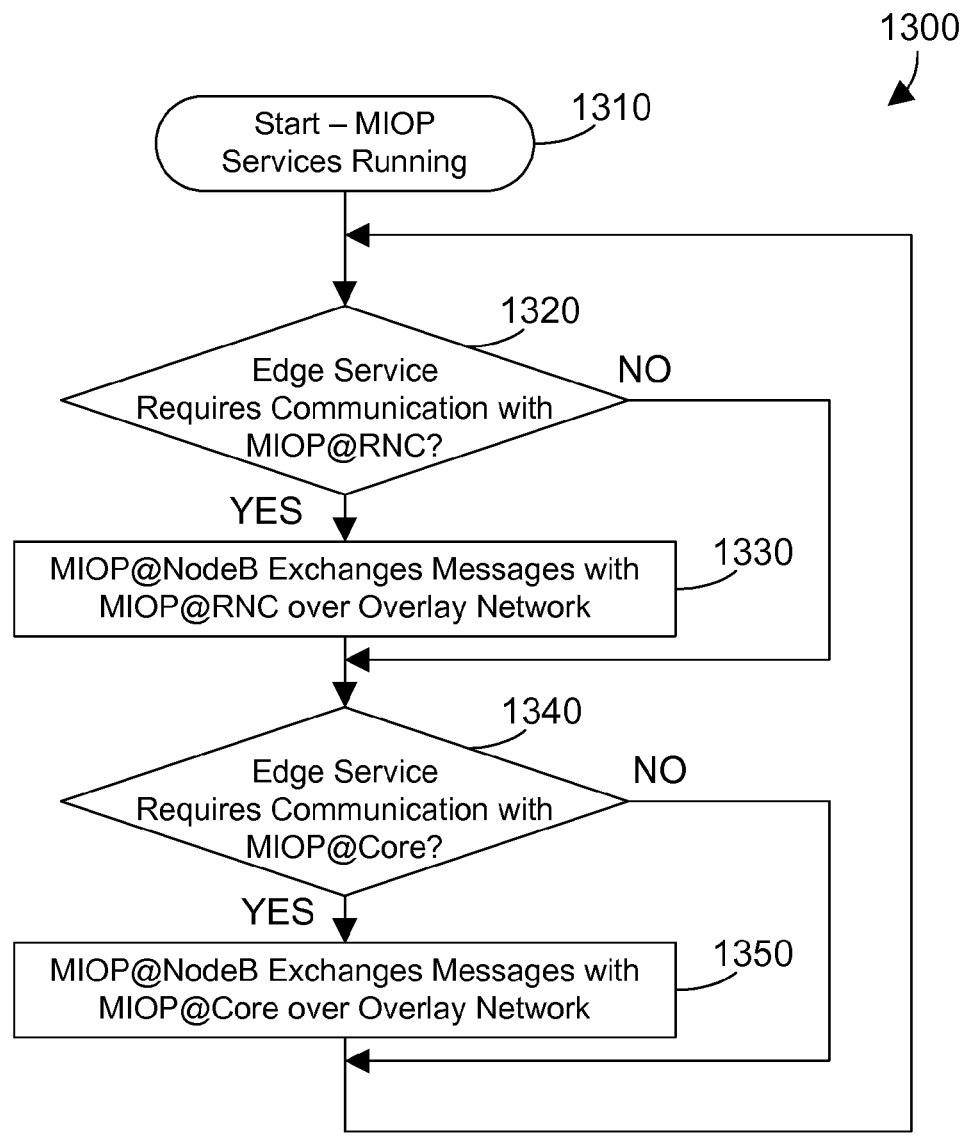
FIGS. 13-15 are flow diagrams that each show communications between MIOP components when MIOP services are running.

MIOP services may require communicating between MIOP components on the overlay network. Referring to FIG. 13, a method 1300 shows communications by MIOP@NodeB when MIOP services are running (step 1310). When the edge service mechanism requires communication with MIOP@RNC (step 1320=YES), MIOP@NodeB exchanges messages with MIOP@RNC over the overlay network (step 1330). When the edge service mechanism requires communication with MIOP@Core (step 1340=YES), MIOP@NodeB exchanges messages with MIOP@Core over the overlay network (step 1350). The overlay network thus allows the various MIOP components to communicate with each other when MIOP services are running.

Figure 14:
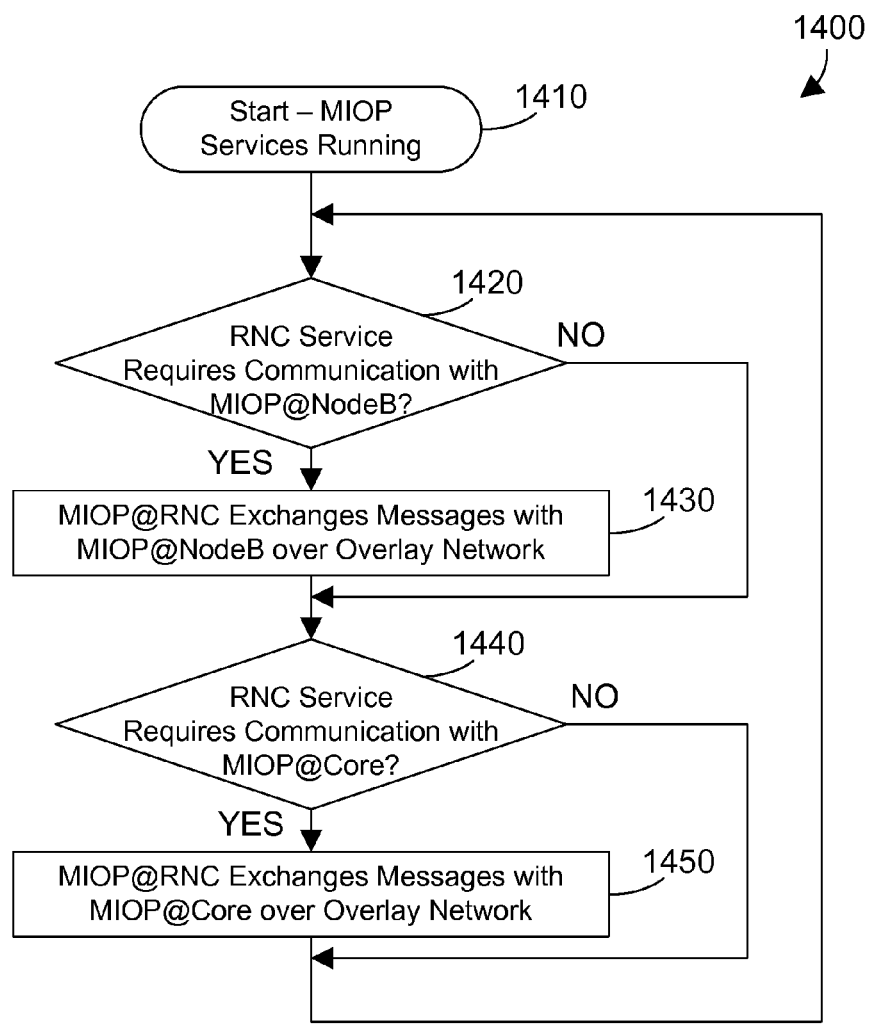

FIG. 14 shows a method 1400 that shows communications by MIOP@RNC when MIOP services are running (step 1410). When the RNC service mechanism requires communication with MIOP@NodeB (step 1420=YES), MIOP@RNC exchanges messages with MIOP@NodeB over the overlay network (step 1430). When the RNC service mechanism requires communication with MIOP@Core (step 1440=YES), MIOP@RNC exchanges messages with MIOP@Core over the overlay network (step 1450).

Figure 15:
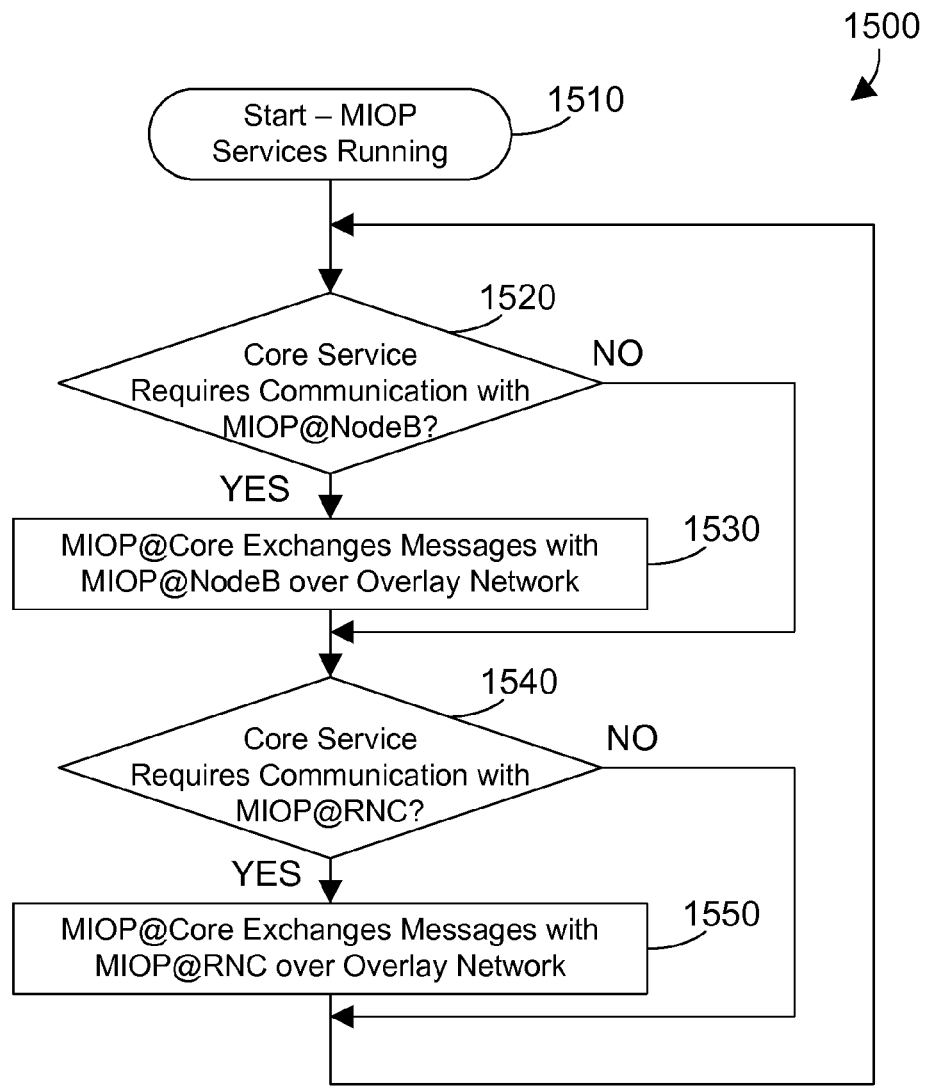

FIG. 15 shows a method 1500 that shows communications by MIOP@Core when MIOP services are running (step 1510). When the core service mechanism requires communication with MIOP@NodeB (step 1520=YES), MIOP@Core exchanges messages with MIOP@NodeB over the overlay network (step 1530) relayed via MIOP@RNC. When the core service mechanism requires communication with MIOP@RNC (step 1540=YES), MIOP@Core exchanges messages with MIOP@RNC over the overlay network (step 1550).

Figure 16:
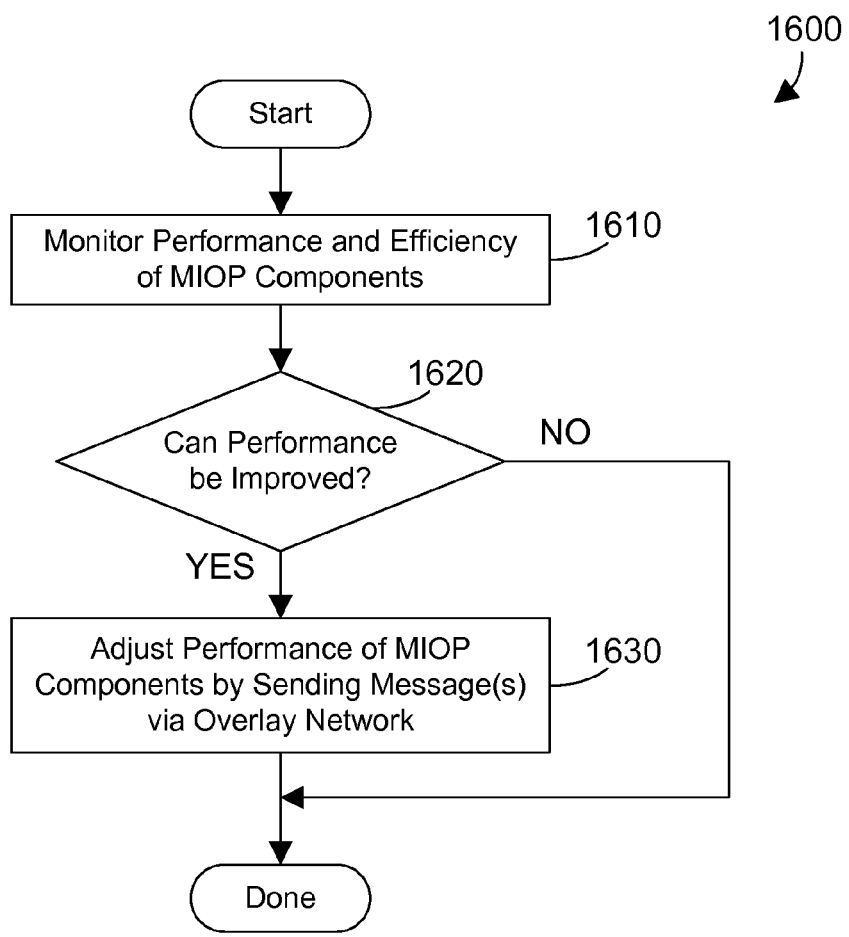
FIG. 16 is a flow diagram of a method for managing and adjusting the MIOP components.

FIG. 16 shows a method 1600 that is preferably performed by MIOP@NMS 240 in FIGS. 2 and 7. The performance and efficiency of the MIOP components that perform MIOP services are monitored (step 1610). The MIOP components that perform MIOP services may include MIOP@NodeB 210, MIOP@RNC 220, and MIOP@Core 230, assuming all of these components are present in the mobile data network 200. When performance may be improved (step 1620=YES), the performance of the MIOP components is adjusted (if implemented and applicable) by sending one or more network messages via the overlay network (step 1630). Note also a human operator could also manually reconfigure the MIOP components to be more efficient.

Figure 17:
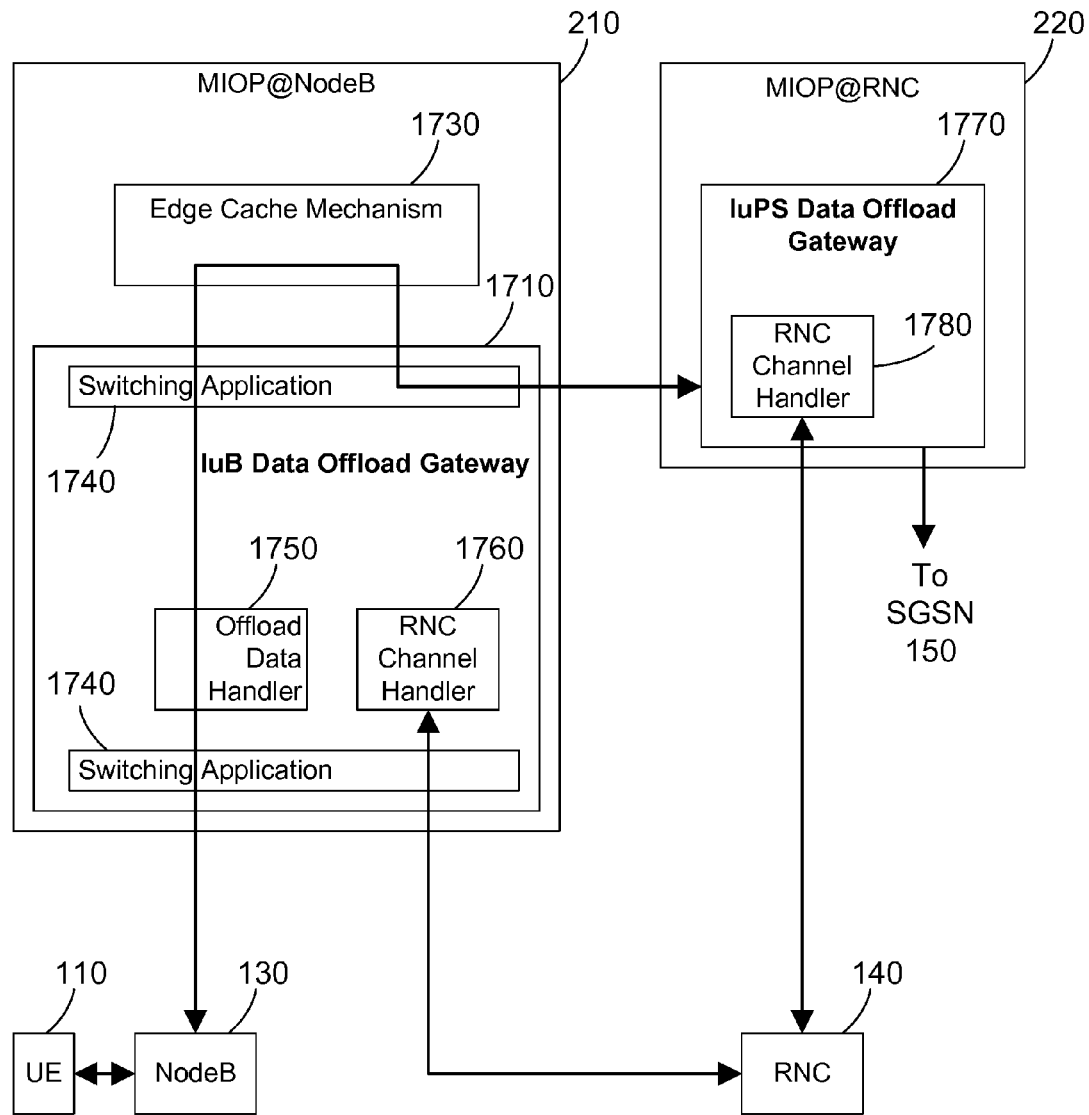
FIG. 17 is a block diagram of one specific implementation for MIOP@NodeB and MIOP@RNC.

Referring to FIG. 17, implementations for MIOP@NodeB 210 and MIOP@RNC 220 are shown by way of example. Other implementations are possible within the scope of the disclosure and claims herein. User equipment 110 is connected to NodeB 130. Note the antenna 120 shown in FIG. 2 is not shown in FIG. 17, but is understood to be present to enable the communication between user equipment 110 and NodeB 130. MIOP@NodeB 210 includes an edge cache mechanism 1730, which is one suitable example of edge service mechanism 430 in FIG. 4. MIOP@NodeB 210 includes an interface referred to herein as IuB Data Offload Gateway (IuB DOGW) 1710. This gateway 1710 implements the breakout mechanism 410 according to one or more specified breakout preconditions 420 shown in FIG. 4. IuB DOGW 1710 includes a switching application 1740, an offload data handler 1750, and an RNC channel handler 1760. The switching application 1740 is responsible for monitoring data packets received from NodeB 130, forwards according to it configuration the broken out data packets to the offload data handler, relays the non-broken out data packets and control system flows to the RNC 140 via the original connections in the RAN. While switching application 1740 is shown as two separate boxes in FIG. 17, this is done to visually indicate the switching application 1740 performs switching on two different interfaces, the network interface and overlay network interface, but the switching application 1740 is preferably a single entity.

When a breakout decision is made and MIOP@RNC 220 sends a message to MIOP@NodeB 210 authorizing breakout (see step 1040 in FIG. 10), when MIOP@NodeB decides to breakout specified user data, the specified user data received by the switching application 1740 from NodeB 130 is broken out, which means the switching application 1740 routes the specified user data to the offload data handler 1750 so the broken out data is routed to the data path defined for breakout data. The offload data handler 1750 may send the data to the edge cache mechanism 1730 for processing, which can route the data directly to MIOP@RNC 220 via the overlay network, as shown by the path with arrows going from NodeB 130 to MIOP@RNC 220.

User data that is not broken out and signaling traffic is routed directly back by the switching application 1740 to RNC. In this manner, non-broken out data and signaling traffic passes through the IuB DOGW 1710 to RNC 140, while broken out data is routed by the IuB DOGW 1710 to a different destination. Note that edge cache mechanism 1730 may send messages to MIOP@RNC 220 as shown in FIG. 17, but the broken out messages themselves are not sent to MIOP@RNC 220.

MIOP@RNC 220 includes an interface referred to herein as IuPS data offload gateway (IuPS DOGW) 1770. IuPS DOGW 1770 forwards all signaling and non-broken out data traffic from RNC 140 to SGSN 150 via the GTP tunnel. IuPS DOGW 1770 includes the breakout mechanism 510, breakout criteria 520 and subscriber registration mechanism 530 shown in FIG. 5 and discussed above with reference to FIG. 5. IuPS DOGW 1770 may exchange messages with IuB DOGW 1710 via the overlay network to perform any needed service in MIOP@NodeB 210 or MIOP@RNC 220. For the specific implementation shown in FIG. 17, while the IuPS DOGW 1770 in MIOP@RNC 220 does not include an offload data handler, the IuPS DOGW 1770 could include an offload data handler and switching application similar to those shown in MIOP@NodeB 210 when MIOP@RNC 220 also needs to perform breakout of data.

The IuPS DOGW 1770 includes an RNC channel handler 1780. The RNC channel handlers 1760 in MIOP@NodeB 210 and 1780 in MIOP@RNC 220 monitor data traffic to and from RNC 140 related to a broken out subscriber session and provide a keep-alive channel maintenance mechanism.

Figure 18:
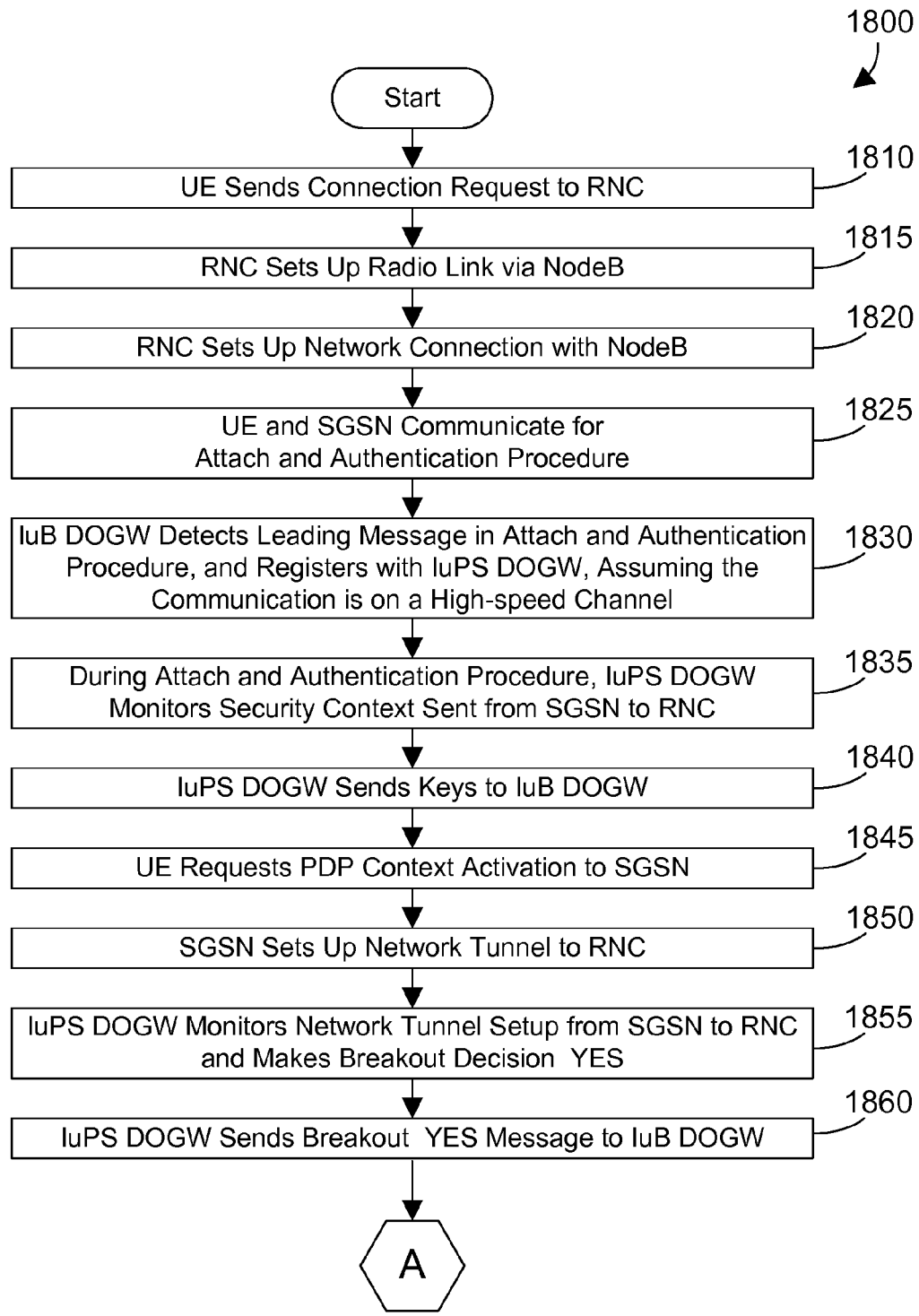
FIGS. 18 and 19 show a flow diagram of a first method for the specific implementation shown in FIG. 17.
Figure 19:
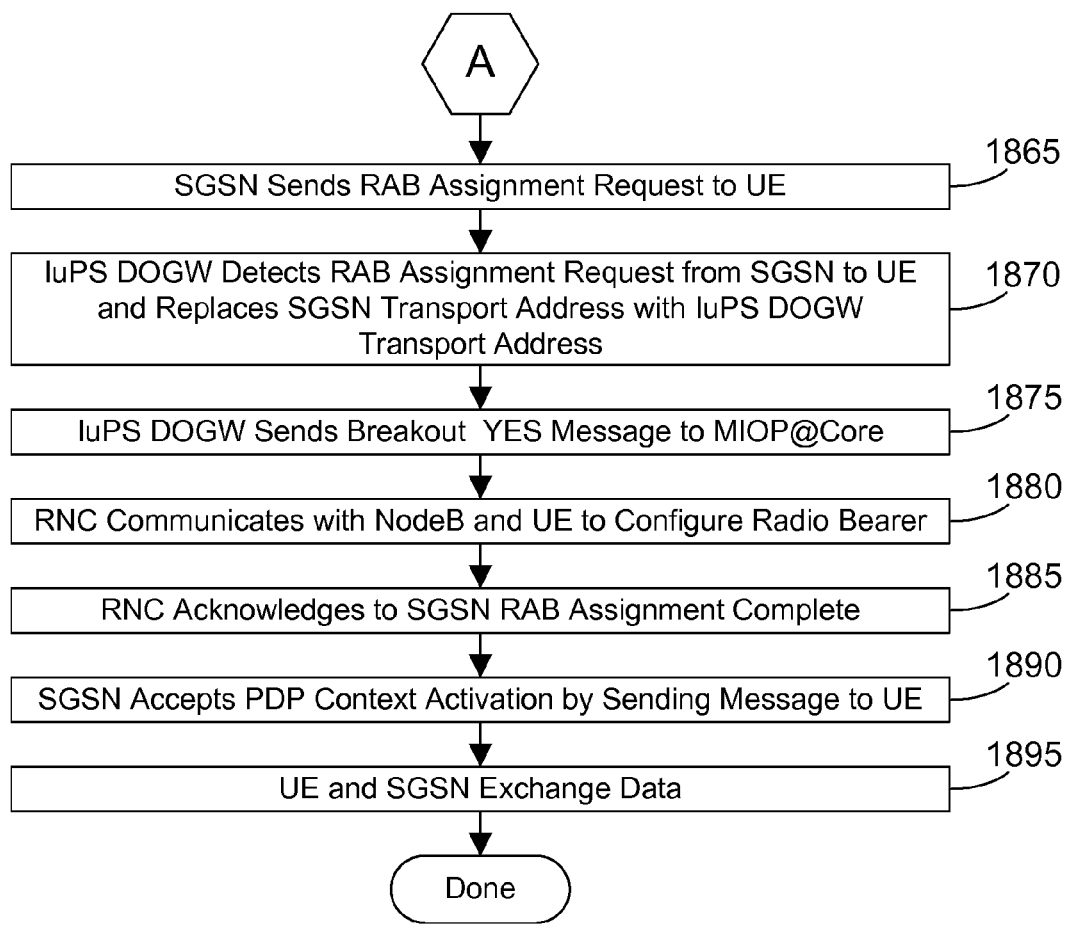

Specific methods are shown in FIGS. 18-21 that illustrate how the specific implementation in FIG. 17 could be used. FIGS. 18 and 19 show a method 1800 for setting up breakout of data. The UE sends a connection request to the RNC (step 1810). The RNC sets up a radio link via NodeB (step 1815). The RNC then sets up a network connection with NodeB (step 1820). The UE and SGSN then communicate for the attach and authentication procedure (step 1825). IuB DOGW detects the leading message in the attach and authentication procedure, and registers the subscriber session with IuPS DOGW when preconditions are fulfilled (e.g. UE is capable to carry high speed traffic) (step 1830). During the attach and authentication procedure, IuPS DOGW monitors the security context sent from SGSN to RNC (step 1835). IuPS DOGW then sends keys to IuB DOGW (step 1840). These keys are needed to decipher (decrypt) the upcoming signaling and uplink user data and to cipher (encrypt) the downlink user data. UE then requests PDP context activation to SGSN (step 1845). In response, SGSN sets up a network tunnel to RNC (step 1850). IuPS DOGW monitors network tunnel setup from SGSN to RNC and makes a decision breakout=YES (step 1855). IuPS DOGW sends a message to IuB DOGW indicating breakout=YES (step 1860). Continuing on FIG. 19, SGSN sends an RAB assignment request to UE (step 1865). IuPS DOGW detects the RAB assignment request from SGSN to UE and replaces the SGSN transport address with IuPS DOGW transport address (step 1870). IuPS DOGW sends a message to MIOP@Core indicating breakout=YES (step 1875). RNC communicates with NodeB and UE to (re) configure signaling and data radio bearer (step 1880). RNC acknowledges to SGSN when RAB assignment is complete (step 1885). SGSN accepts PDP context activation by sending a message to UE (step 1890). UE and SGSN may then exchange data for the PDP context (step 1895).

Figure 20:
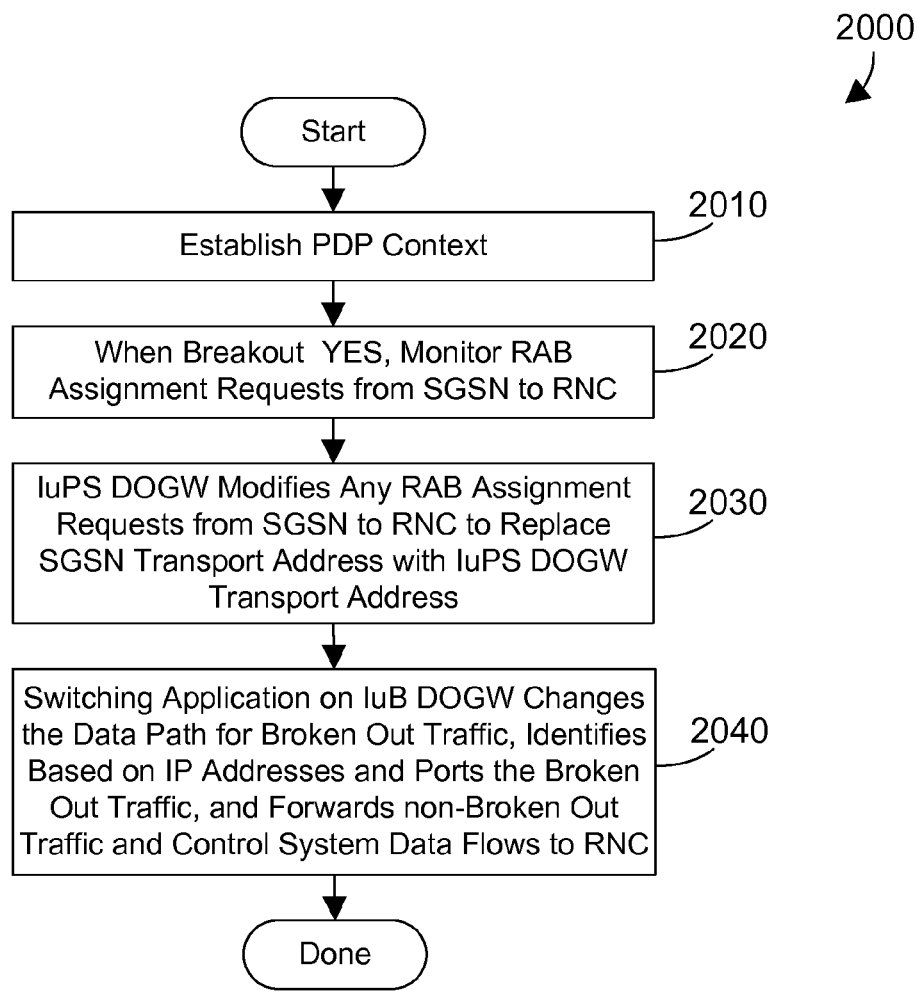
FIG. 20 is a flow diagram of a second method for the specific implementation shown in FIG. 17.

Referring to FIG. 20, a method 2000 begins by establishing a PDP context (step 2010). Method 1800 in FIGS. 18 and 19 include the detailed steps for establishing a PDP context. When breakout=YES, RAB assignment requests from SGSN to RNC are monitored by IuPS DOGW (step 2020). IuPS DOGW modifies any RAB assignment requests from SGSN to RNC to replace the SGSN transport address in the RAB assignment request with the IuPS DOGW transport address (step 2030) in case of matching breakout criteria during PDP context activation procedure. The switching application on IuB DOGW is configured upon the RAN transport layer setup to identify based on IP addresses and ports the broken out traffic and forwards this traffic to the Offload data handler 1765, and forwards non-broken out traffic and control system data flows to the RNC (step 2040).

Figure 21:
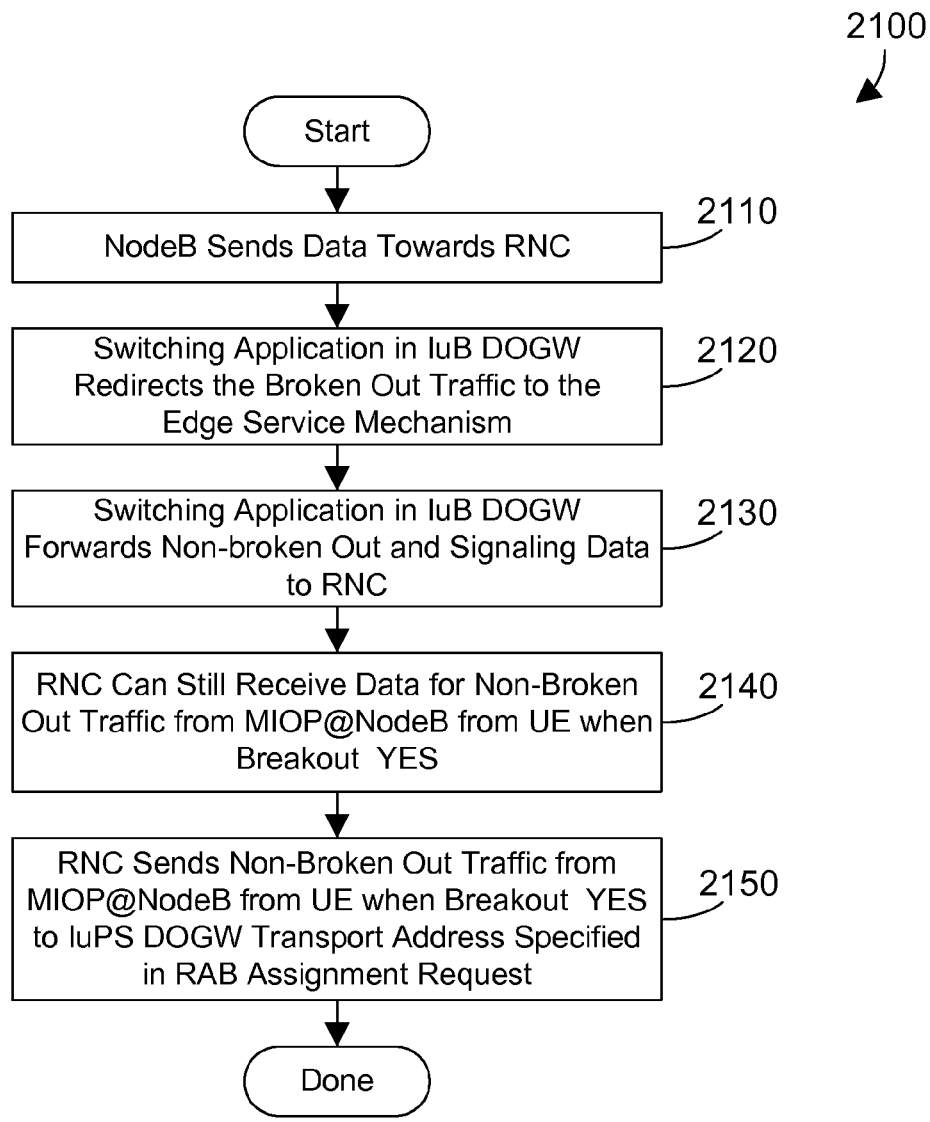
FIG. 21 is a flow diagram of a third method for the specific implementation shown in FIG. 17.

Referring to FIG. 21, a method 2100 begins when NodeB sends data towards RNC (step 2110). The switching application in IuB DOGW redirects the broken out traffic to the edge service mechanism (step 2120), such as edge cache mechanism 1730 in FIG. 17. The switching application also forwards non-broken out data and signaling data to the RNC (step 2130) via the original RAN connections. The RNC can still receive data for non-broken out traffic from MIOP@NodeB when breakout=YES (step 2140). The RNC then sends non-broken out traffic from MIOP@NodeB from UE when breakout=YES to IuPS DOGW transport address specified in RAB assignment request (step 2150).

Figure 22:
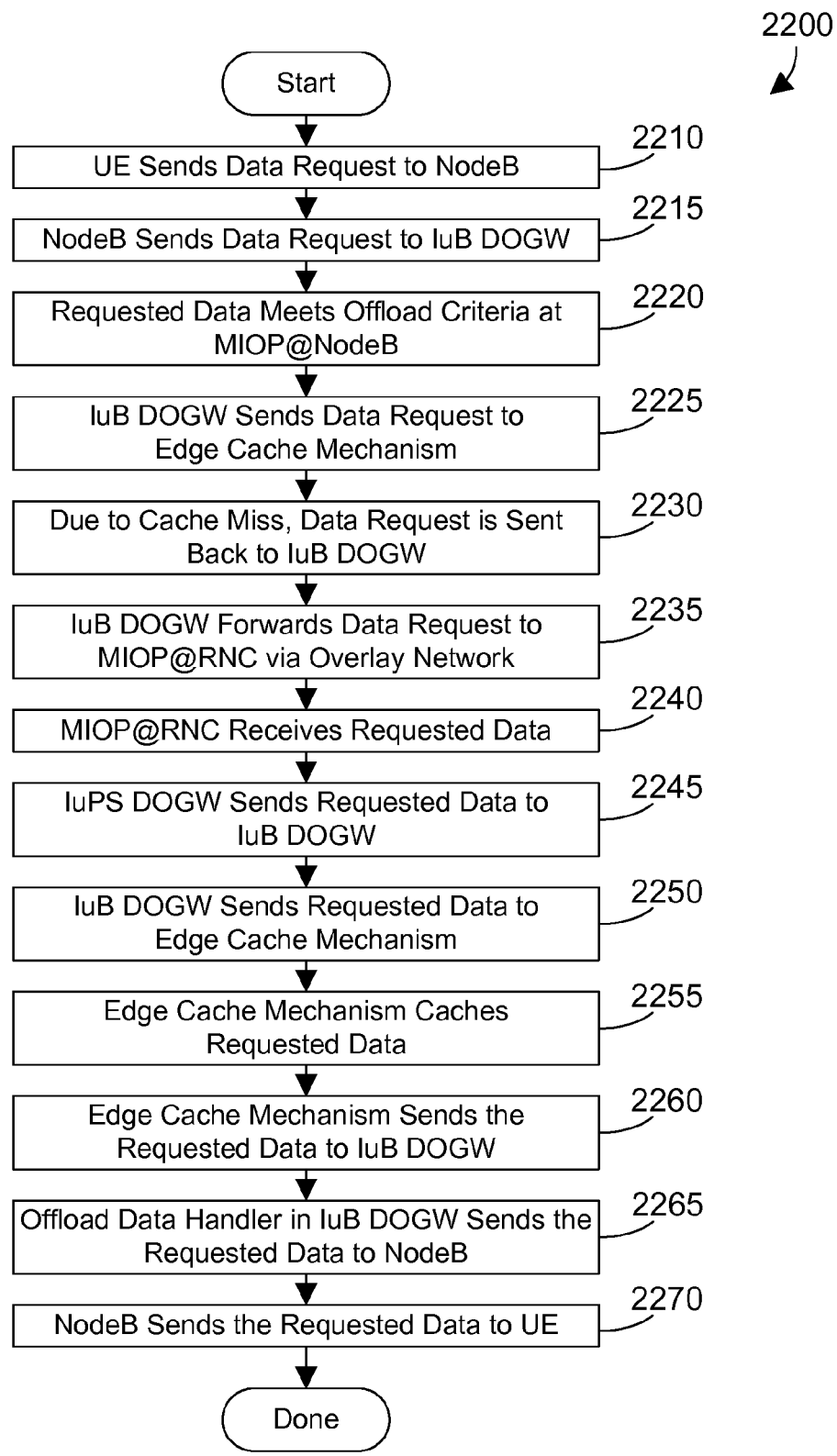
FIG. 22 is a flow diagram of a method for the specific implementation shown in FIG. 17 to process a data request that results in a cache miss at MIOP@NodeB.

A simple example is now provided for the specific implementation in FIG. 17 to show how data can be cached and delivered by MIOP@NodeB 210. Referring to FIG. 22, method 2200 represents steps performed in the implementation in FIG. 17 for a cache miss. UE sends a data request to NodeB (step 2210). NodeB sends the data request to IuB DOGW (step 2215). We assume the requested data meets the offload criteria at MIOP@NodeB (step 2220), which means MIOP@NodeB has been authorized to perform breakout and has determined this requested data should be broken out. IuB DOGW sends the data request to the edge cache mechanism (step 2225). We assume the data is not present in the edge cache mechanism, so due to the cache miss, the edge cache mechanism sends the data request back to IuB DOGW (step 2230). IuB DOGW then forwards the data request to MIOP@RNC via the overlay network (step 2235). In the worst case the content is not cached on MIOP@RNC or MIOP@Core, MIOP@RNC routes the data request to via the overlay network to the MIOP@Core, which passes the data request up the line to the internet, which delivers the requested data to MIOP@Core, which delivers the requested data via the overlay network to MIOP@RNC (step 2240). IuPS DOGW then sends the requested data to IuB DOGW (step 2245). IuB DOGW then sends the requested data to the edge cache mechanism (step 2250). The edge cache mechanism caches the requested data (step 2255). The edge cache mechanism sends the requested data to IuB DOGW (step 2260). The offload data handler in IuB DOGW sends the requested data to NodeB (step 2265). NodeB then sends the requested data to UE (step 2270). At this point, method 2200 is done.

Figure 23:
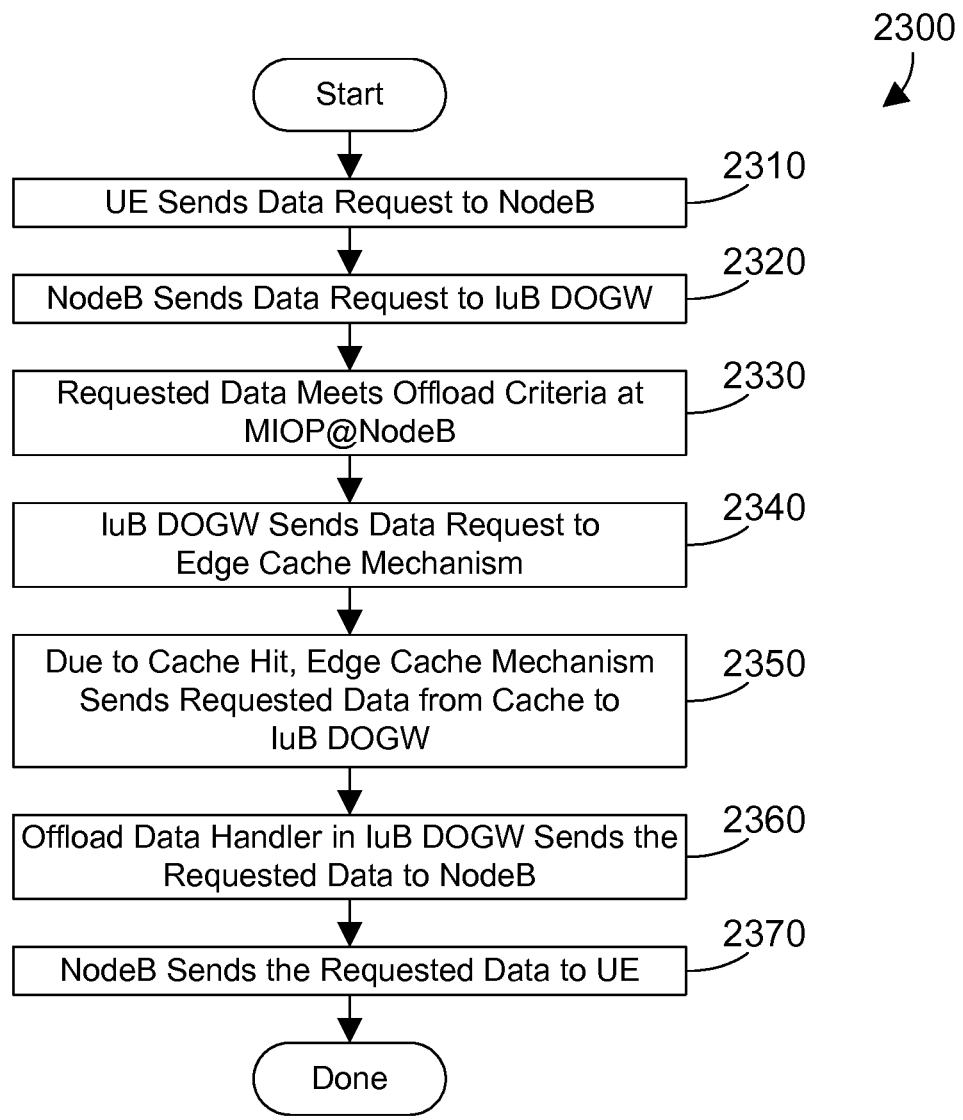
FIG. 23 is a flow diagram of a method for the specific implementation shown in FIG. 17 to process a data request that results in a cache hit at MIOP@NodeB.

Method 2300 in FIG. 23 shows the steps performed for a cache hit in the specific implementation in FIG. 17. The UE sends the data request to NodeB (step 2310). NodeB sends the data request to IuB DOGW (step 2320). The requested data meets the offload criteria at MIOP@NodeB (step 2330). IuB DOGW sends the data request to the edge cache mechanism (step 2340). Due to a cache hit, the edge cache mechanism sends the requested data from the cache to IuB DOGW (step 2350). The offload data handler in IuB DOGW sends the requested data to NodeB (step 2360). Node B then sends the requested data to UE (step 2370). Method 2300 shows a great advantage in caching data at MIOP@NodeB. With data cached at MIOP@NodeB, the data may be delivered to the user equipment without any backhaul on the core network. The result is reduced network congestion in the core network while improving quality of service to the subscriber.

The methods shown in FIGS. 18-23 provide detailed steps for the specific implementation in FIG. 17. Other implementations may have detailed steps that are different than those shown in FIGS. 18-23. These are shown by way of example, and are not limiting of the disclosure and claims herein.

The architecture of the MIOP system allows services to be layered or nested. For example, the MIOP system could determine to do breakout of high-speed channels at MIOP@NodeB, and to do breakout of low-speed channels at MIOP@RNC. In another example, MIOP@NodeB may have a cache, MIOP@RNC may also have a cache, and MIOP@Core may also have a cache. If there is a cache miss at MIOP@NodeB, the cache in MIOP@RNC could be checked, followed by checking the cache in MIOP@Core. Thus, decisions can be dynamically made according to varying conditions of what data to cache and where.

To support the MIOP services that are possible with the mobile data network 200 shown in FIG. 2, the preferred configuration of MIOP@NodeB 210 is a combination of hardware and software. The preferred configuration of MIOP@RNC 220 is also a combination of hardware and software. The preferred configuration of MIOP@Core 230 is software only, and can be run on any suitable hardware in the core network. The preferred configuration of MIOP@NMS 240 is software only, and can also be run on any suitable hardware in the core network.

In the most preferred implementation, the various functions of MIOP@NodeB 210, MIOP@RNC 220, MIOP@Core 230, and MIOP@NMS 240 are performed in a manner that is nearly transparent to existing equipment in the mobile data network. Thus, the components in prior art mobile data network 100 that are also shown in the mobile data network 200 in FIG. 2 have no knowledge of the existence of the various MIOP components, with the exception of existing routers that may need to be updated with routing entries corresponding to the MIOP components. The MIOP services are provided by the MIOP components in a way that requires no changes to hardware and only minor changes to software (i.e., new router entries) in any existing equipment in the mobile data network, thereby making the operation of the MIOP components transparent to the existing equipment once the MIOP components are installed and configured. The result is a system for upgrading existing mobile data networks as shown in FIG. 1 in a way that does not require extensive hardware or software changes to the existing equipment. The MIOP services herein can thus be performed without requiring significant capital expenditures to replace or reprogram existing equipment.

The mobile data network 200 disclosed herein includes MIOP components that provide a variety of different services that are not possible in prior art mobile data network 100. In the most preferred implementation, the MIOP components do not affect voice traffic in the mobile data network. In addition to performing optimizations that will enhance performance in the form of improved download speeds, lower latency for access, or improved quality of experience in viewing multimedia on the mobile data network, the MIOP architecture also provides additional capabilities that may produce new revenue-generating activities for the carrier. For example, analytics may be performed on subscriber sessions that allow targeting specific subscribers with additional services from the carrier to generate additional revenue. For example, subscribers congregating for a live music event may be sent promotions on paid for media related to that event. In another example, subscribers getting off a train may be sent a coupon promoting a particular shuttle company as they walk up the platform towards the street curb. Also, premium web content in the form of video or other multimedia may be served from local storage and the subscriber would pay for the additional content and quality of service.

While the mobile data network in FIG. 2 and discussed herein is in the context of a 3G mobile data network, the disclosure and claims herein expressly extend to other networks as well, including Long Term Evolution (LTE) networks, flat RAN networks, and code division multiple access (CDMA) networks.

Figure 24:
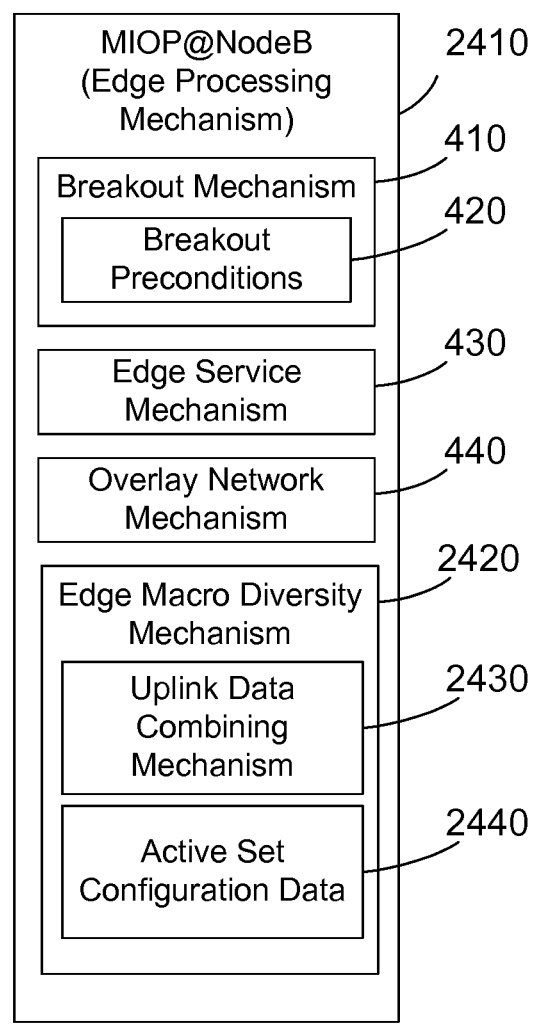
FIG. 24 is a block diagram of a MIOP@NodeB that supports edge macro diversity.

FIG. 24 illustrates an expanded version of the MIOP@NodeB introduced in FIG. 4. In addition to the breakout mechanism 410, edge service mechanism 430, and the overlay network mechanism 440 described above, the MIOP@NodeB 210 also preferably includes an edge macro diversity mechanism 2420 which includes an uplink data combining mechanism 2430 and active set configuration data 2440. A MIOP@NodeB 2410 is one type of edge processing mechanism. The edge macro diversity mechanism 2420, the uplink data combining mechanism 2430, and active set configuration data 2440 are described more below. As used herein, an edge processing mechanism is a general term for a mechanism that performs the functions of the MIOP@NodeB described herein.

Referring to FIG. 24, the active set configuration data 2440 is maintained by the edge macro diversity mechanism 2420 that may include a copy of the active set and the identity of the master MIOP@NodeB. To change the active set in a typical system, the RNC sends a message to the UE. The MIOP@NodeBs monitors this signaling message to determine the current active set members for the active set configuration data. The MIOP@NodeBs can communicate configuration information over the overlay network with other MIOP@NodeBs to maintain the active set configuration data 2440.

Figure 25:
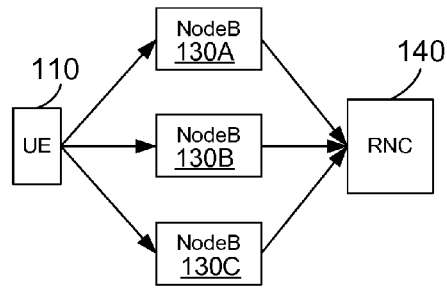
FIG. 25 is a block diagram that illustrates uplink of signaling data from multiple NodeBs to the RNC according to the prior art.

Because the MIOP components are interconnected via the overlay network, this architecture supports performing macro diversity at the edge of the mobile data network in a MIOP@NodeB. In the prior art, macro diversity was handled in the RNC 140. FIG. 25 is a block diagram that illustrates uplink of data from user equipment through multiple NodeBs to the RNC according to the prior art. As discussed above, user equipment, such as a mobile phone, may see signals from antennas that are located at different basestations. In this example, UE 110 sees the antennas of three basestations with corresponding NodeBs 130A, 130B, and 130C. The three NodeBs 130A, 130B, and 130C represent the active set of basestations for the UE participating in macro diversity for a given session. An active set is the set of NodeBs the UE is simultaneously connected to. Each NodeB of the active set forwards packets to the RNC 140. The RNC selects the best packets from the three NodeBs 130A, 130B and 130C to assemble the data from the UE 110. The active set is maintained by the RNC, and all the macro diversity functions are performed by the RNC. Macro diversity needs to be supported for signaling traffic, otherwise there is a risk of losing signaling data. If signaling messages are lost, the MIOP@NodeB may go out of sync with the network with respect to that UE and it therefore may not be possible to further manage the sessions for that UE.

Figure 26:
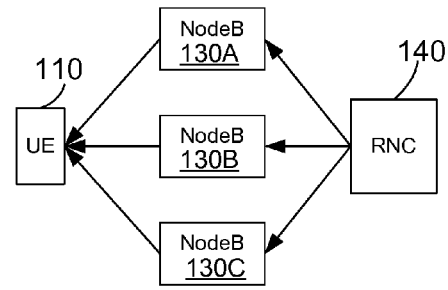
FIG. 26 is a block diagram that illustrates downlink of data from the RNC to multiple NodeBs according to the prior art.

FIG. 26 is a block diagram that illustrates downlink of data from the RNC 140 to multiple NodeBs 130A, 130B, and 130C according to the prior art. The three NodeBs 130A, 130B, and 130C represent the active set of NodeBs for the UE participating in macro diversity. The RNC 140 forwards downlink data to each NodeB of the active set. The NodeBs 130A, 130B, and 130C then send the downlink data to the UE 110, which recombines the packets from the NodeBs of the active set.

Figure 27:
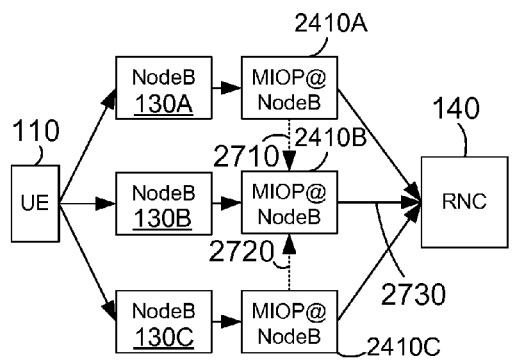
FIG. 27 is a block diagram that illustrates uplink of data from multiple NodeBs to the RNC.

FIG. 27 illustrates an example of uplink signaling data from multiple NodeBs sent to the RNC as described and claimed herein. In this example, UE 110 sees the antennas of three basestations with corresponding NodeBs 130A, 130B, and 130C. These three NodeBs represent the active set in the same manner as described in the prior art. However, the three NodeBs 130A, 130B, 130C in this example each have a corresponding MIOP@NodeB 2410A, 2410B, 2410C. As described above, the MIOP@NodeBs provide mobile services at the edge of the mobile data network by breaking out user data. The MIOP@NodeBs 2410A, 2410B and 2410C intercept uplink signaling data from their respective NodeBs 130A, 130B and 130C in the active set. One of the MIOP@NodeBs is designated a master, while the others are designated slaves. The slave MIOP@NodeBs then communicate received data packets to the master MIOP@NodeB. In this example in FIG. 27, the master is MIOP@NodeB 2410B. The remaining two MIOP@NodeBs 2410A and 2410C send their uplink data to the master MIOP@NodeB 2410B over the overlay network (e.g., 250 in FIG. 2), as shown at 2710 and 2720 in FIG. 27. The master 2410B then combines its own uplink signaling data and the uplink signaling data received from the two slave MIOP@NodeBs 2410A and 2410C, and generates a best packet out of this combined data. Each slave MIOP@NodeB sends its data to the master MIOP@NodeB, which combines the data from all into a best packet. In this way the master MIOP@NodeB will have the exact same signaling data that the RNC will have when it combines the packets. This operation is described in more detail below.

Figure 28:
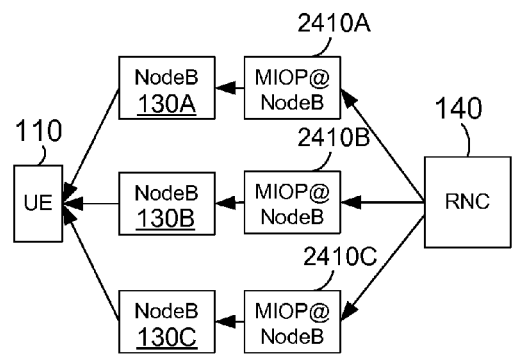
FIG. 28 is a block diagram that illustrates downlink of signaling data from the RNC to multiple NodeBs.

FIG. 28 illustrates an example of downlink signaling data from the RNC 140 to multiple NodeBs 130A, 130B and 130C. The RNC 140 sends the downlink signaling data to all three NodeBs 130A, 130B and 130C that are currently connected (i.e., in the active set) for UE 110. Downlink signaling data sent by the RNC 140 is received by each MIOP@NodeB 2410A, 2410B and 2410C, then passed on without modification to the respective NodeBs 130A, 130B and 130C. The NodeBs 130A, 130B, and 130C then send the downlink data to the UE 110, which recombines the packets from the NodeBs of the active set. Macro diversity does not need to be supported in downlink of signaling data because the communication from the RNC to the MIOP@NodeB is over a more robust network link or non-air interface. Thus the MIOP@NodeBs do not need to combine the messages but the messages are combined at the UE.

As introduced above with reference to FIG. 17, user equipment 110 communicates with a NodeB 130A connected to an RNC 140. The MIOP@NodeB 210B is in line between NodeB 130A and RNC 140 such that the MIOP@NodeB can monitor the traffic flow, and then relay to the RNC signaling data and non-broken out user data via the original path. When a session is broken out as described above, MIOP@NodeB 210B communicates with the MIOP@RNC 220 over the overlay network 250 to manage macro diversity as described herein.

Figure 29:
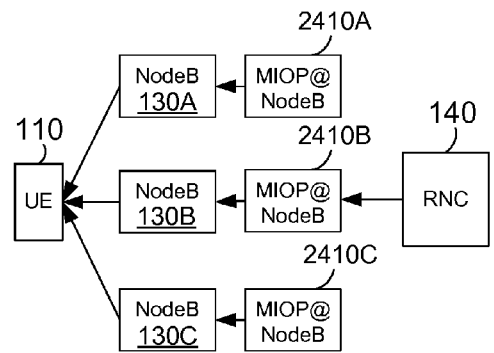
FIG. 29 is a block diagram that illustrates downlink of user data from the RNC.

FIG. 29 illustrates downlink of user data. Macro diversity is not available for high speed shared channels that are used to send downlink user data to the UE. As a result, the RNC 140 sends the downlink user data to only one of the MIOP@NodeBs 2410B, which sends the downlink user data to its corresponding NodeB 130B, which sends the downlink user data to the user equipment 110. FIG. 29 simply shows that macro diversity is not available on high speed shared channels which are used to downlink user data.

FIG. 30 is a block diagram illustrating an example of uplink signaling communication between a UE 110, NodeBs 130B, 130C, a master MIOP@NodeB 2410B, a slave MIOP@NodeB 2410C and the RNC 140 for macro diversity at the edge with breakout at MIOP@NodeB. Note the two MIOP@NodeBs 2410B and 2410C are instances of MIOP@NodeB 2410 shown in FIG. 24, which each include an edge macro diversity mechanism 2420. The configuration in FIG. 30 is a more detailed representation for the example shown in FIG. 27, except only two of the three NodeBs and corresponding MIOP@NodeBs in FIG. 27 are shown in FIG. 30. For the example in FIG. 30, the edge macrodiversity mechanism 2420B is implemented within the IuB DOGW 1710 that was described above with respect to FIG. 17. It is assumed that a session between the UE 110 and a first NodeB 130B is already in breakout through the IuB Data Offload Gateway 1710 as described above with reference to FIG. 17. A session enters soft handover when the active set changes to include an additional NodeB 130C. Data flow for uplink signaling data for a UE 110 in soft-handover would be as follows. The UE 110 sends signaling data 3010 to both NodeBs 130B and 130C. The NodeBs 130B and 130C send 3020 the uplink signaling data to their respective MIOP@NodeB 2410B, 2410C. The edge macro diversity mechanism 2420 detects the active set changing and determines the new NodeB 130C in the active set has an associated MIOP@NodeB 210C. One of the MIOP@NodeBs is designated as the master. For this particular example, we assume MIOP@NodeB 2410B is designated as the master, which is communicated to MIOP@NodeB 2410C via the overlay network, which makes MIOP@NodeB 2410C a slave. The slave MIOP@NodeB 2410C sends uplink signaling data 3030 to the master MIOP@NodeB 2410B. The uplink signaling data 3030 from the slave MIOP@NodeB 2410C to the master MIOP@NodeB 2410B is carried over the overlay network 250 described above. The slave MIOP@NodeB 2410C may also send the uplink signaling data 3040 to the RNC 140 to insure that the master MIOP@NodeB 2410B and the RNC 140 will see the same level of accuracy in the combined data. An uplink data combining mechanism 2430 combines uplink data in the master MIOP@NodeB 2410 with uplink data received from all slave MIOP@NodeBs, in this example the one slave MIOP@NodeB 2410C, to generate a best packet so that the MIOP@NodeB will have the exact same signaling data as the RNC when it combines the packets.

FIG. 31 is a block diagram illustrating an example of downlink signaling communication between an RNC 140 and UE 110 in a system that includes MIOP@NodeBs for macro diversity at the edge with breakout at MIOP@NodeB. The configuration in FIG. 31 is a more detailed representation for the example shown in FIG. 28, except only two of the three NodeBs and corresponding MIOP@NodeBs in FIG. 28 are shown in FIG. 31. For the example in FIG. 31, the downlink signaling data 3110 is sent by RNC 140 to master MIOP@NodeB 2410B and slave MIOP@NodeB 2410C. The IuB DOGW in each MIOP@NodeB 2410B and 2410C forwards this data on unchanged to the respective NodeBs 130B and 130C. The NodeBs 130B and 130C then send the data to the UE 110, which recombines the packets from received from the NodeBs 130B and 130C.

FIG. 32 is a block diagram illustrating an example of uplink and downlink of user data in a system that includes MIOP@NodeBs for macro diversity at the edge with breakout at MIOP@NodeB. The configuration in FIG. 32 is a more detailed representation for the example shown in FIG. 29 for the downlink case, except only two of the three NodeBs and corresponding MIOP@NodeBs in FIG. 29 are shown in FIG. 32. For the example in FIG. 32, for the case of down link user data, as stated above with respect to FIG. 29, macro diversity at the edge is not available for high speed shared control channels because the channels do not belong to a single UE. As a result the downlink data 3210 is sent from RNC 140 to IuB DOGW 1710, which forwards the data to NodeB 130B, which forwards the data to the user equipment 110. The data is not sent to the slave MIOP@NodeB 2410C because macro diversity is not available for the downlink of user data.

For the case of uplink of user data with respect to FIG. 32, the UE 110 uploads the user data 3220 to the NodeBs 130B and 130C. Each of the NodeBs 130B and 130C sends the uplink user data 3230 to their respective MIOP@NodeBs 2410B and 2410C. The slave MIOP@NodeB 2410C does not forward the data to the RNC 140. The master MIOP@NodeB 2410B forwards the uplink user data to the edge cache mechanism 1730. We assume the result is a cache hit, meaning the data can be downloaded from the edge cache mechanism 1730 to the user equipment 110 without having to access the data on a public network. In response, the edge cache mechanism 1730 sends the downlink data to IuB DOGW 1710, which sends the data to NodeB 130B. NodeB 130B passes the downlink data 1214 to the UE 110. Because the broken out user data in the MIOP@NodeBs is not seen at the RNC 140 as described in detail above with respect to FIG. 17, the RNC cannot perform macro diversity for any NodeBs that have a corresponding MIOP@NodeB due to the prospect of broken out data that would be hidden from the RNC. Since the RNC does not see this broken out traffic, the RNC channel handler 1760 in the MIOP@NodeB sends channel maintenance traffic on the radio connection 3210 to the RNC so the RNC will maintain the broken out session with the UE and applies macro diversity on this channel maintenance traffic.

The examples in FIGS. 30-32 illustrate that macro diversity can be accomplished at the edge of the mobile data network (i.e., in a master MIOP@NodeB) even when there is breakout at the edge of the mobile data network.

Figure 33:
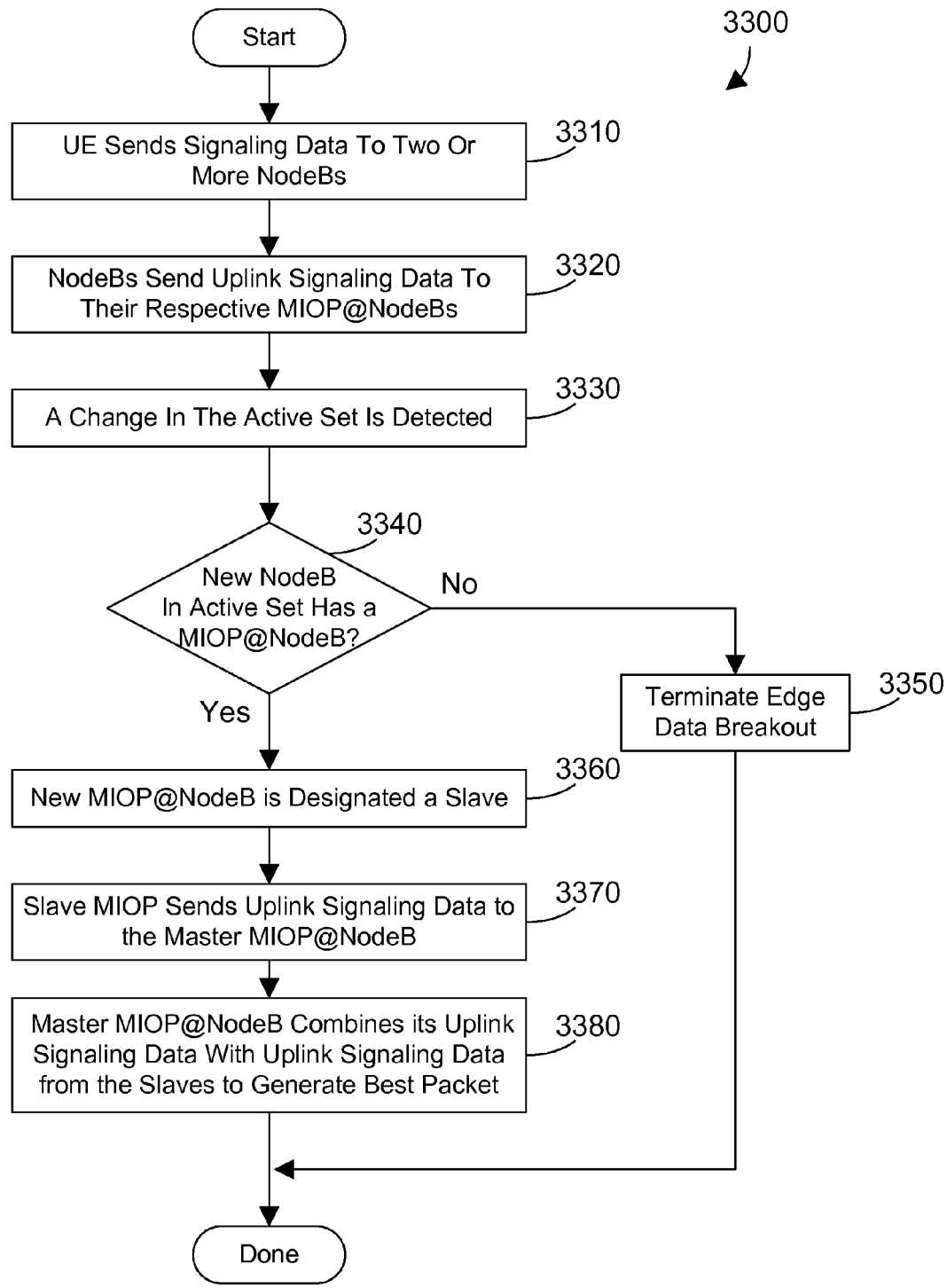
FIG. 33 is a flow diagram of a method for uplink signaling communication between a slave base station and a master basestation, and then to the RNC for macro diversity at the edge with breakout at the edge.

FIG. 33 is a flow diagram of a method 3300 for handling uplink of signaling data for macro diversity at the edge with breakout at the edge. The steps of method 3300 are preferably performed by the entities as described with reference to FIG. 30 above. Method 3300 begins with at least one MIOP@NodeB in an active set of a broken out subscriber session. A UE sends signaling data to two or more NodeBs (step 3310). The NodeBs then send the received uplink signaling data to their respective MIOP@NodeBs (step 3320). A change in the active set is detected (step 3330). From the change in active set, it is determined a new NodeB has been added to the active set. If the new NodeB does not have a MIOP@NodeB (step 3340=NO), then the edge data breakout session is terminated (step 3350) and the method 3300 is done. If the new NodeB does have a corresponding MIOP@NodeB (step 3340=YES), then the new MIOP@NodeB is designated a slave (step 3360). The slave MIOP@NodeB sends uplink signaling data to the master MIOP@NodeB (step 3370). The master MIOP@NodeB then combines its own uplink signaling data with the uplink signaling data received from the slaves to generate a best packet (step 3380). The method 3300 is then done.

Figure 34:
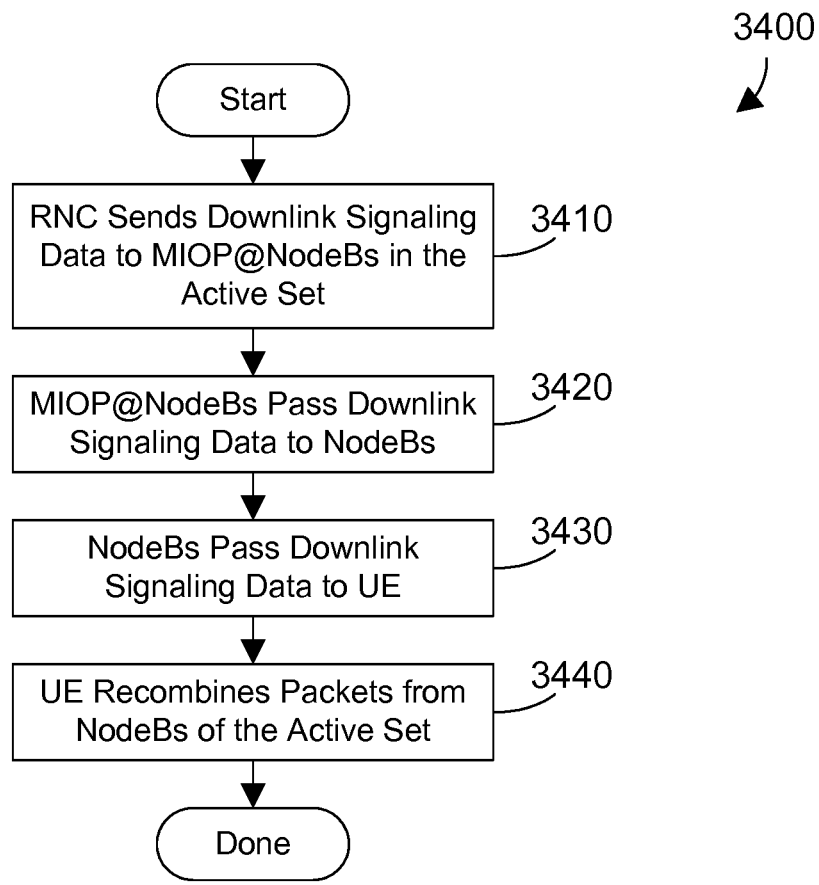
FIG. 34 is a flow diagram of a method for downlink signaling communication between an RNC and user equipment.

FIG. 34 is a flow diagram of a method for handling downlink of signaling data for macro diversity at the edge with breakout at the edge. The RNC sends downlink signaling data to the MIOP@NodeBs in the active set (step 3410). The MIOP@NodeBs pass the downlink signaling data to their corresponding NodeBs (step 3420). The NodeBs then pass the downlink signaling data to the user equipment (step 3430). The user equipment then recombines the packets from the NodeBs of the active set (step 3440), and method 3400 is done.

Figure 35:
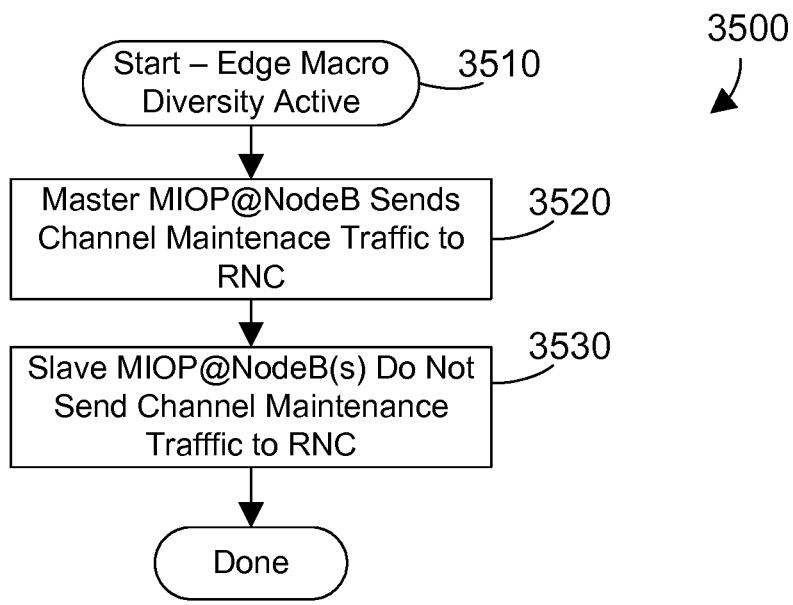
FIG. 35 is a flow diagram of a method for handling maintenance traffic on a radio channel when edge macro diversity is active.

Referring back to FIG. 17, it was explained above the RNC channel handlers 1760 in MIOP@NodeB 210 and 1780 in MIOP@RNC 220 monitor data traffic to and from RNC 140 related to a broken out subscriber session, and insert channel maintenance traffic as needed in an effort to keep the RNC 140 from switching the subscriber session from a high speed channel to a low-speed channel. However, in the case of macro diversity at the edge, it would cause unnecessary backhaul on the core network if all MIOP@NodeBs in an active set inserted channel maintenance traffic. Method 3500 in FIG. 35 prevents this problem. Method 3500 begins when edge macro diversity is active (step 3510). The master MIOP@NodeB sends channel maintenance traffic to the RNC (step 3520), but the slave MIOP@NodeBs do not (step 3530). The channel maintenance logic within IuB DOGW 1710 thus takes into account whether macro diversity is active or not, and whether the MIOP@NodeB is a master or a slave. This prevents excessive channel maintenance traffic from being inserted by all of the NodeBs in an active set.

Figure 36:
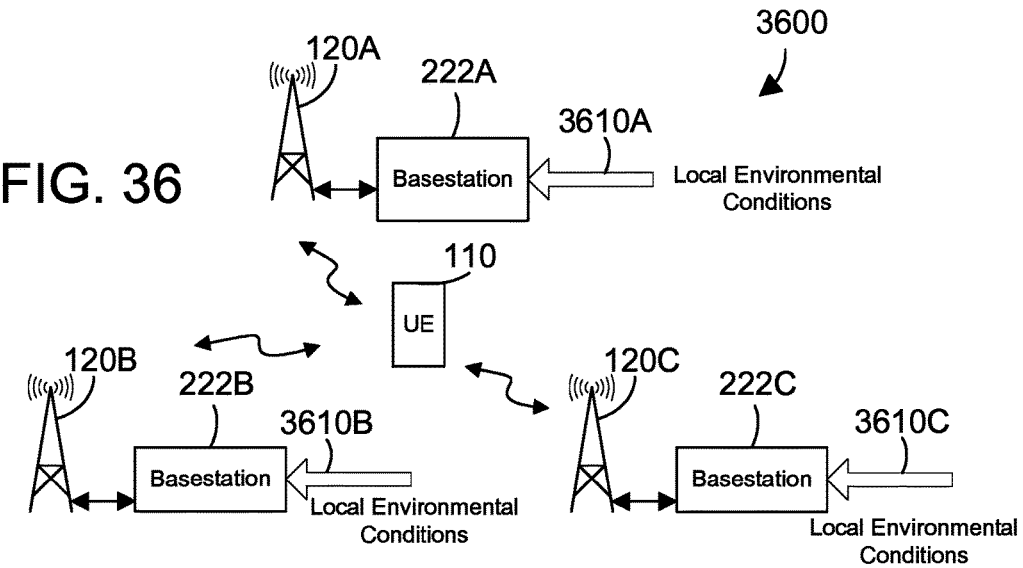
FIG. 36 is a block diagram illustrating several towers and basestations that communicate with a user equipment.

FIG. 36 is a block diagram illustrating a mobile communication system 3600 that uses historical data, ambient conditions, weather alerts and weather forecasts to take preemptive actions against failure as claimed herein. The mobile communication system 3600 includes several towers 120A-120C and their associated basestations 222A-222C. The towers 120A-120C and basestations 222A-222C communicate with user equipment 110 as described above. Each of the basestations 222A-222C have local environmental conditions 3610A-3610C.

Figure 37:
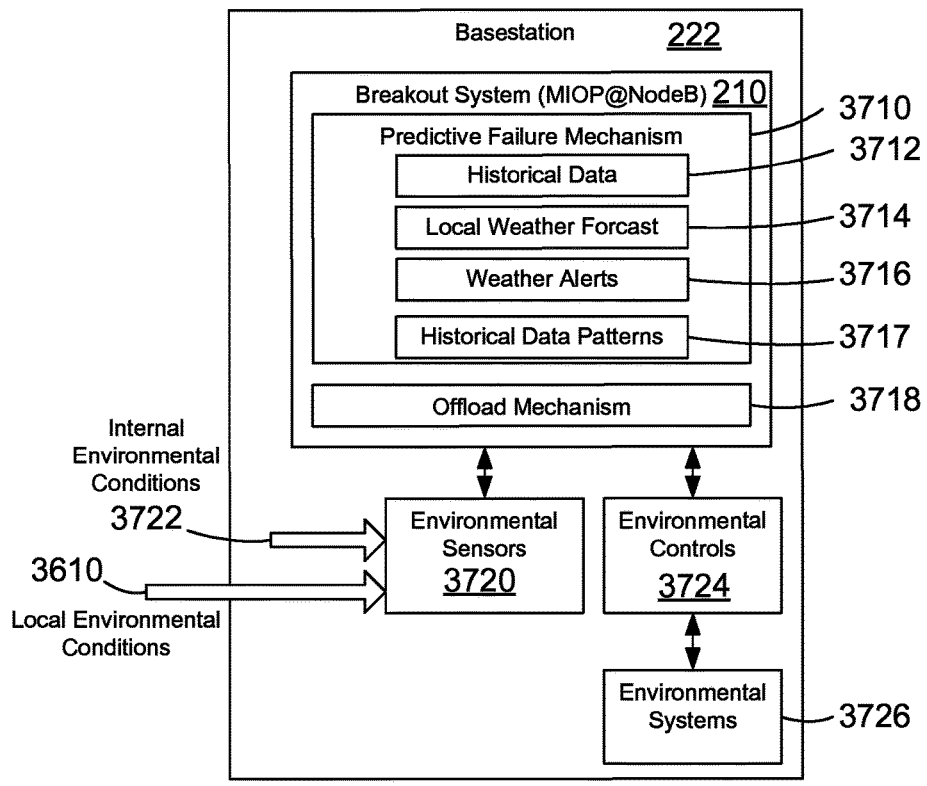
FIG. 37 is a block diagram of a basestation with a MIOP@NodeB that uses historical usage patterns, local environmental conditions and weather forecasts to take preemptive actions against failure.

FIG. 37 is a block diagram representing one of the basestations 222 shown in FIG. 36. The basestation 222 includes a breakout system which is referred to in the illustrated example as the MIOP@NodeB 210 (FIG. 1). Further, the MIOP@NodeB 210 includes a predictive failure mechanism 3710 that uses historical data 3712, environmental conditions (described further below) and weather forecasts 3714, and weather alerts 3716 to take preemptive actions against failure. The historical data 3712 is analyzed to determine historical data patterns 3717 that are also stored to predict failures. The MIOP@NodeB 210 also includes an offload mechanism 3718 to offload work to other basestations as described below. The basestation 222 preferably includes environmental sensors 3720 that include sensors to monitor local environmental conditions 3610 outside the basestation 222 and internal environmental conditions 3722 inside the basestation and/or inside the MIOP@NodeB 210. The environmental sensors 3720 may be part of the MIOP@NodeB 210 or within other equipment inside the basestation 222. The environmental sensors may also be located at other locations and the data sent to the MIOP@NodeB. For example, the sensors may be located at other nearby basestations or at a nearby weather station (not shown). The environmental sensors may include sensors for temperature, humidity, wind speed, barometric pressure, etc. The basestation 222 further may include environmental controls 3724 and environmental systems 3726. The environmental controls 3724 allows the predictive failure mechanism 3710 to control any environmental systems 3726 in the basestation such as fans, dehumidifiers, cooling equipment, etc.

Again referring to FIG. 37, the predictive failure mechanism 3710 creates and maintains the historical data 3712 that is used to predict possible failures in conjunction with the local weather forecast 3714, weather alerts 3716 and environmental conditions 3610, 3722. The predictive failure mechanism 3710 monitors such conditions as failure data, data loads and usage patterns on the basestation over time to create and store the historical data 3712. The local weather forecast 3714 is preferably obtained by the predictive failure mechanism 3710 through the connections of the MIOP@NodeB 210 with the internet to get a local weather forecast for the area where the basestation is located. The local weather forecast obtained remotely could be used in conjunction with the local environmental conditions 3610 sensed by the environmental sensors 3720. The weather alerts 3716 may be other weather related information provided or obtained by the predictive failure mechanism. The weather alerts 3716 may be obtained from other basestations or from upstream in the network such as the RNC. For example, the weather alerts 3716 could be an alert of a tornado, fire, or other severe weather alert from the RNC or from a nearby basestation.

FIG. 38A is a table of historical data that illustrates a simple example of historical data gathered by the predictive failure mechanism used to take preemptive actions against a predicted failure. In this example in FIG. 38A, the historical data is historical failure data 3712A. The predictive failure mechanism monitors and gathers historical data, stores the historical data in an appropriate location such as the MIOP@NodeB, performs trend analysis on the historical data and stores historical data patterns 3717. These steps are further described in FIG. 40. The historical failure data 3712 may include date 3810 and time 3812 of the failure, load 3814, external temperature 3816, humidity 3818, failure condition 3820, wind speed 3822, and failure type 3824. The load 3814 may be given as a factor or percent of maximum load as shown. In this example, there is a failure indicated for each row of data. The predictive failure mechanism could perform trend analysis on this data to determine when there is a high probability of a failure. In a first example, the predictive failure mechanism could perform trend analysis on the first four rows of data in FIG. 38A to determine that there is a high probability of a failure when there is a frigid condition of less than or equal to −30 degrees and less than or equal to 12% humidity. The predictive failure mechanism would then store a first trend 3910 in the historical data patterns as shown in FIG. 39. In a second example, the predictive failure mechanism could perform trend analysis and from the last three rows of data in FIG. 38A it could determine that there is a high probability of a thermal failure when there is a hot and humid condition when there is a temperature greater than or equal to 97 degrees and greater than or equal to 90% humidity. The predictive failure mechanism would then store a second trend 3912 in the historical data patterns 3717 as shown in FIG. 39.

FIG. 38B is a table of historical data that illustrates another example of historical data gathered by the predictive failure mechanism to be used to take preemptive actions against a predicted failure. FIG. 38B shows examples of historical load data 3712B. In this example, the predictive failure mechanism monitors and stores the data as shown regardless of whether there is a failure. The predictive failure mechanism may then analyze the historical load data and determine the relationship between temperatures and loading to determine a predicted failure. For example, the data in FIG. 38B could be used to determine high demand periods of time. For example, the analysis by the predictive failure mechanism could determine from the data shown in the last two rows of FIG. 38B that there is typically a load of 100% on Sunday afternoons at 3:00. A pattern record 3916 could be stored in this historical data pattern 3717 to indicate this typical data load of 100%. In addition, the predictive failure mechanism may determine from the historical load data in FIG. 38B (second row) that external temperatures above 98 F and loading of 100% create internal temperatures that are known to cause failure per the historical failure data in FIG. 38A. The predictive failure mechanism would then create a historical data pattern 3914 as shown in FIG. 39. These historical data patterns 3914 and 3916 could be used as follows. If the current conditions are approaching 98 F or if the weather forecast indicates a high temperature at 98 F or above and the data load is at 100 or predicted to be at 100 based on a historical pattern (3916), then the predictive failure mechanism will take pre-emptive action to prevent a predicted failure.

FIG. 38C is another table of historical data gathered by the predictive failure mechanism. FIG. 38C shows examples of historical usage data 3712C that is related to customer usage of the data services provided by the MIOP@NodeB. The predictive failure mechanism monitors and gathers historical usage data to determine the preemptive actions in anticipation of a predicted failure. The historical usage data may include a customer identification or number 3830, data type 3832, data rate 3834, date 3810 and time 3812. The data rate 3834 could be a maximum or peak data rate for a given length of time. The historical usage data 3712C can be used to determine the priority of customers to reduce loading on the MIOP@NodeB. For example, a pre-emptive action taken for a predicted failure may be to reduce system loading to reduce the temperature of the MIOP@NodeB equipment if the equipment is approaching a critical temperature per the historical data patterns 3717. To reduce system loading, the predictive failure mechanism may give priority or deference to certain types of customers or certain data types. The collected usage patterns could contain customer identifiers and their data usage by data rate and/or type. When the predictive failure mechanism takes pre-emptive action to avert a failure it may not be able to offload the workload to a neighboring workstation, in this case the predictive failure mechanism could reduce the workload on the MIOP@NodeB by selecting some customers that will not be broken out and thus get a reduced quality of service in exchange for preventing a failure. In this example, the pre-emptive action taken by the predictive failure mechanism could be to give a higher priority to customers like Customer 2 3842 and Customer 3 3844 that are using less data by continuing to breakout service for these customers. In contrast, customers like Customer 1 3840 that are using higher data rates would be given a lower priority and may not be broken out. Alternatively priority may be given to customers using a specific data type to maintain a core function. The date field 3810 and the time field 38212 provides additional information that allows the MIOP@NodeB to make intelligent decisions about which aspects of the MIOP@NodeB to shut down or offload to reduce loading.

FIG. 39 is a table of historical data patterns 3717 created by the predictive failure mechanism to be used to take preemptive actions against a predicted failure. The historical data patterns 3717 are patterns of historical data gathered by the predictive failure mechanism that relate to a failure of the MIOP@NodeB system or critical data related to a potential failure. The historical data patterns 3717 may include a trend name 3920, a load 3922, a condition 3924, specific measured conditions such as temperature 3926 and humidity 3928. The historical data patterns 3717 may also include the type of failure 3930 and a typical time period 3932. The historical data patterns 3910 and 3912 were determined by the predictive failure mechanism from the data in FIG. 38A as described above. The historical data patterns 3914 and 3616 were determined by the predictive failure mechanism from the data in FIG. 38B as described above.

As described herein, the predictive failure mechanism uses historical data 3712, historical data patterns 3717, environmental conditions from environmental sensors 3720, weather alerts 3716 and weather forecasts 3714 to take preemptive actions against failure. The preemptive action can take several different forms. The predictive failure mechanism could use environmental controls of the basestation or MIOP@NodeB to prevent a failure by such actions as increasing fan speeds, increasing or turning on other environmental control systems 3726 (FIG. 37) introduced above. For example, this could include cooling the internal environment beyond normal ranges in preparation for an abnormally hot day. For example, if the local weather forecast indicates that the high temperature will be over 100 degrees F., and this MIOP@NodeB appliance has reached thermal limits at temperatures over 100 degrees F. in the past, it is likely that the MIOP@NodeB appliance is likely to experience another similar failure. Thus the preemptive action could be to run cooling equipment in advance in preparation for the hot day. The preemptive action taken may also be to shut down the system. For example, if there is not sufficient cooling capacity then the preemptive action may be to gracefully end the breakout of all UEs on the MIOP@NodeB system and then shut down the MIOP@NodeB to prevent any user disruptions or permanent damage to the MIOP@NodeB.

Alternatively, the preemptive action of the predictive failure mechanism could involve offloading workload using the offload mechanism 3718 introduced above with reference to FIG. 37. The offload mechanism 3718 allows the MIOP@NodeB to offload workload to other MIOP@NodeBs in the same basestation, other basestation, or upstream system or equipment in the mobile data network. The offload mechanism may include the diversity mechanism and other data communication means known in the prior art and those described herein for communication between basestations and upstream systems such as the RNC. The offload mechanism allows the predictive failure mechanism to offload workload as a preemptive action. For example, the predictive failure mechanism could communicate with adjacent cell tower basestation over the overlay network to offload workload to other basestations in the active set as described above with respect to macro diversity. In another example, the predictive failure mechanism could offload work deeper into the mobile data network. This could entail bringing up additional capacity back at the RNC or core to handle the additional workloads. While offloading workload upstream in the network may result in some degraded speeds from the end user's perspective, slower speed is preferable to no service as a result of a sudden failure condition.

There are other scenarios where the predictive failure mechanism might offload work to other MIOP@NodeBs. For example, if a MIOP@NodeB receives a weather alert of a nearby tornado, work could be offloaded to MIOP@NodeBs that are not in the predicted path of the tornado. The predictive failure mechanism may get an alert of a tornado from a nearby basestation, the RNC, a weather station or from a weather forecast.

The predictive failure mechanism could also be used to assist in maintenance of the MIOP@NodeB and other basestation equipment to preemptively prevent failures. For example, since the RNC has access to the data of potentially hundreds or thousands of NodeBs, it could determine that there is a pattern of failures specific to a certain geographic area. In one area with high humidity, for example, a single power supply failure may soon be followed by another power supply failure, and technicians could proactively replace the other hardware likely to fail. Using the data gathered by the predictive failure mechanism a preemptive action may be to replace suspected components prior to a season change or due to a weather forecast.

FIG. 40 is a flow diagram of a method 4000 for creating historical data for predicting failures (3712 in FIG. 37). The steps of method 4000 are preferably performed by the predictive failure mechanism 3710. Method 4000 begins with monitoring data on the basestation over an extended period of time (step 4010). Next gather appropriate historical data for predicting failures (step 4020). This historical data may include historical failure data, historical load data and historical usage data. Then store the historical data in the MIOP@NodeB (step 4030). Next, over time and/or periodically perform trend analysis on the gathered historical data (step 4040) to determine historical data patterns. Then store the historical data patterns in the MIOP@NodeB (step 4050). The method is then done.

FIG. 41 is a flow diagram of a method 4100 for mitigating the effects of predicted failures in a mobile network basestation due to weather conditions. The steps of method 4100 are preferably performed by the predictive failure mechanism 3710. First, get a weather forecast for the area of the basestation containing the predictive failure mechanism (step 4110). Next, get a weather alert if available (step 4120). Then get current environmental conditions including internal to the basestation and/or MIOP@NodeB and local environmental conditions of the basestation (step 4130). Then get historical data patterns (step 4140). Next, using the obtained data in the previous steps, determine if there is a predicted failure (step 4150). If there is no predicted failure (step 4150=no) then the method is done. If there is a predicted failure (step 4150=yes) then take preemptive action (step 4160). The preemptive action could include one or more of the following: offload workload to another basestation, offload workload to a system upstream in the mobile data network, reduce the workload, activate environmental controls in the MIOP@NodeB and/or activate environmental controls in the basestation. The method is then done.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

The disclosure and claims are directed to a predictive failure mechanism in a basestation appliance that mitigates the effects of failures in a mobile network basestation due to weather conditions. The predictive failure mechanism considers usage patterns, ambient conditions and weather forecasts to take pre-emptive action to avert partial or total failure of the basestation equipment to provide a more robust mobile data network.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for mitigating predicted failures in a mobile data network due to weather, the method comprising the steps of:
   on a breakout system in a basestation performing the steps of:
      breaking out user data from an intercepted data stream from a user equipment so that the breakout system can perform a service for the user equipment;
      obtaining a local weather forecast for the basestation;
      obtaining local environmental conditions outside of the basestation and inside of the basestation;
      obtaining a historical data pattern derived from historical data of the basestation;
      using the local weather forecast, the local environmental conditions and the historical data pattern to determine if there is a predicted failure;
      when there is a predicted failure then taking pre-emptive action to mitigate the predicted failure;
      wherein the action taken to mitigate the predicted failure comprises communicating with environmental systems to take pre-emptive measures, and the pre-emptive measures include cooling an internal environment of the basestation having mobile basestation equipment beyond a normal range in preparation for a forecasted abnormally hot condition; and
      wherein the action taken to mitigate the predicted failure comprises gracefully ending breakout of user data of all user equipment on the breakout system and then shutting down the breakout system.

2. The method of claim 1 wherein the step of obtaining a historical data pattern comprises the steps of:
   monitoring usage of the basestation over time;
   gathering the historical data;
   storing the historical data;
   performing trend analysis on the stored historical data to create historical data patterns; and
   storing the historical data patterns.

3. The method of claim 1 wherein the predictive failure mechanism determines the historical data pattern from historical load data, where the historical data pattern includes external and internal temperatures that are known to cause a failure at a specific loading percentage and where the specific loading percentage typically occurs at a specific time of a week.

4. The method of claim 1 wherein the action taken to mitigate the predicted failure comprises offloading workload of the breakout system that includes providing the service for the user equipment to another location chosen from the following: an adjacent basestation, and a system upstream in the mobile data network.

5. The method of claim 1 wherein the environmental systems include an environmental system within the basestation that controls environmental conditions within the basestation and an environmental system in the breakout system.

6. The method of claim 1 wherein the action taken to mitigate the predicted failure comprises reducing a workload on the breakout system by selecting users that will not be broken out based on collected usage patterns for the users.

7. The method claim 1 wherein the historical data used to derive the historical data patterns to predict the failure comprise: historical failure data and historical load data.

8. The method of claim 1 wherein the action taken to mitigate the predicted failure comprises reducing a workload on the breakout system by selecting users that will not be broken out based on a specific data type being used by the users.

9. A method for mitigating predicted failures in a mobile data network due to weather, the method comprising the steps of:
   on a breakout system in a basestation performing the steps of:
      breaking out user data of a user from an intercepted data stream from a user equipment so that the breakout system can perform a service for the user equipment;
      obtaining a local weather forecast for the basestation;
      obtaining local environmental conditions outside a basestation and inside the basestation;
      obtaining a historical data pattern derived from historical data of the basestation comprising steps a through e:
         a. monitoring usage of the basestation over time;
         b. gathering the historical data;
         c. storing the historical data;
         d. performing trend analysis on the stored historical data to create the historical data pattern; and
         e. storing the historical data pattern;
      using the local weather forecast, the local environmental conditions and the historical data pattern to determine if there is a predicted failure;
      when there is a predicted failure then taking pre-emptive action to mitigate the predicted failure, wherein the action taken to mitigate the predicted failure comprises gracefully ending breakout of user data of all user equipment on the breakout system and then shutting down the breakout system.

10. The method of claim 9 wherein the step of performing trend analysis on the stored historical data to create the historical data pattern includes determining external and internal basestation temperatures that are known to cause a failure at a specific loading percentage and where the specific loading percentage typically occurs at a specific time of a week.

11. The method of claim 9 wherein the action taken to mitigate the predicted failure comprises reducing a workload on the breakout system by selecting users that will not be broken out based on a specific data type being used by the customers.

12. A method for mitigating predicted failures in a mobile data network due to weather, the method comprising the steps of:
   on a breakout system in a basestation performing the steps of:
      breaking out user data of a user from an intercepted data stream from a user equipment so that the breakout system can perform a service for the user equipment;
      obtaining a local weather forecast for the basestation;
      obtaining local environmental conditions outside of the basestation and inside of the basestation;
      obtaining a historical data pattern derived from historical data of the basestation;
      using the local weather forecast, the local environmental conditions and the historical data pattern to determine if there is a predicted failure;
      when there is a predicted failure then taking pre-emptive action to mitigate the predicted failure; and
      wherein the step of obtaining a historical data pattern comprises the steps of:
         monitoring usage of the basestation over time;

gathering the historical data that includes historical failure data, historical load data and historical usage data;

wherein the historical failure data comprises a time, date, temperature, condition and failure;

wherein the historical load data comprises a load percentage for a time and date along with corresponding internal temperature and external temperature;

storing the historical data;

performing trend analysis on the stored historical data to create historical data patterns;

storing the historical data patterns; and wherein the predictive failure mechanism creates the historical data pattern from the historical load data, where the historical data pattern comprises a temperature and a specific load percentage that caused a failure, a condition, and the type of failure, where an electrical failure is caused by a low temperature condition and a thermal failure is caused by a high temperature condition.

13. The method of claim 12 wherein the action taken to mitigate the predicted failure comprises offloading workload of the breakout system that includes providing the service for the user equipment to another location chosen from the following: an adjacent basestation, and a system upstream in the mobile data network.

14. The method of claim 12 wherein the action taken to mitigate the predicted failure comprises reducing the workload by selecting users that will not be broken out based on collected usage patterns for the users.

15. The method of claim 12 wherein the action taken to mitigate the predicted failure comprises gracefully ending breakout of user data of all user equipment on the breakout system and then shutting down the breakout system.

* * * * *